(12) United States Patent
Sun et al.

(10) Patent No.: US 11,843,678 B2
(45) Date of Patent: Dec. 12, 2023

(54) INFORMATION PROCESSING SYSTEM, METHOD, AND PROGRAM

(71) Applicant: NIPPON TELEGRAPH AND TELEPHONE CORPORATION, Tokyo (JP)

(72) Inventors: Jingyu Sun, Musashino (JP); Ikuo Yamasaki, Musashino (JP); Shoko Katayama, Musashino (JP); Seiji Omori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 67 days.

(21) Appl. No.: 17/414,284

(22) PCT Filed: Dec. 17, 2019

(86) PCT No.: PCT/JP2019/049472
§ 371 (c)(1),
(2) Date: Jun. 15, 2021

(87) PCT Pub. No.: WO2020/129995
PCT Pub. Date: Jun. 25, 2020

(65) Prior Publication Data
US 2022/0078257 A1    Mar. 10, 2022

(30) Foreign Application Priority Data
Dec. 18, 2018    (JP) .................................. 2018-236520

(51) Int. Cl.
*H04L 67/565*    (2022.01)
(52) U.S. Cl.
CPC .................................. *H04L 67/565* (2022.05)

(58) Field of Classification Search
None
See application file for complete search history.

(56) References Cited

U.S. PATENT DOCUMENTS

2019/0045033 A1*    2/2019    Agerstam ............... H04W 4/70

FOREIGN PATENT DOCUMENTS

| KR | 20170035961 A | * | 7/2015 | |
|----|---------------|---|--------|--|
| KR | 20170109404 A | * | 9/2017 | ............. G06F 17/30 |
| WO | WO-2016118979 A2 | * | 7/2016 | ........... G06F 16/254 |

OTHER PUBLICATIONS

English translation of KR20170109404A—Woo et al. (Year: 2017).*

(Continued)

*Primary Examiner* — Tonia L Dollinger
*Assistant Examiner* — Ishrat Rashid
(74) *Attorney, Agent, or Firm* — Harness, Dickey & Pierce, P.L.C.

(57) ABSTRACT

An information processing system according to an embodiment includes a conversion proxy that is connected to devices corresponding to a plurality of types of unique standards, and further connected to a common platform server that performs data exchange with applications. The conversion proxy includes an acquisition unit that acquires ontology data described with a data structure corresponding to the unique standards, a device management unit that acquires and manages device information that is unique to devices corresponding to the unique standards, and a common exchange unit that creates a resource in which a data structure common to the plurality of types of unique standards and a data exchange interface corresponding to the unique standards are correlated, on the basis of the ontology data and the device information, and performs data exchange with the common platform server using the resource.

7 Claims, 39 Drawing Sheets

(56) References Cited

OTHER PUBLICATIONS

Nassim Dennouni and Ahmed Lehireche, Towards a spatiotemporel model for the interworking of the GIS, The third edition of the International Conference on Web and Information Technologies (ICWIT'10), Jun. 16, 2010, pp. 1-6.

Ontology based Interworking, ONEM2M Technical Specification TS-0030-V-3.0.1, May 11, 2018, pp. 1-54.

* cited by examiner

INFORMATION PROCESSING SYSTEM, METHOD, AND PROGRAM

CROSS-REFERENCE TO RELATED APPLICATIONS

This application is a 371 U.S. National Phase of International Application No. PCT/JP2019/049472 filed on Dec. 17, 2019, which claims priority to Japanese Application No. 2018-236520 filed on Dec. 18, 2018. The entire disclosures of the above applications are incorporated herein by reference.

TECHNICAL FIELD

An embodiment of the present invention relates to an information processing system, a method, and a program.

BACKGROUND ART

According to predictions made by the IEEE (Institute of Electrical and Electronics Engineers), it is expected that approximately 75.4 billion devices will be connected to the Internet by the year 2025. There is a possibility that such an increase in the number of devices will affect not only special industries, but also a plurality of industries that have various IoT (Internet of Things) standards.

There is demand not only for preparing an excellent common IoT platform (PF (platform)) common to each of the standards, but also for simplifying complicated data exchange with existing standards, in order to adapt to such changes in industries.

Meanwhile, a horizontal-integration type IoT platform standard specification (a partnership project started to promote standardization) called oneM2M has been developed to prevent a proliferation of various IoT standards.

This oneM2M is made up of an aggregate CSE (Common Service Entity), a common function that is non-dependent on communication formats such as data management, device management, and so forth, an IPE (Interworking Proxy Entity) that handles data mapping and exchange with protocols of other standards, and an AE (Application Entity) that uses and utilizes collected data.

In oneM2M, application programs (hereinafter may be referred to as application or app) are connected to the CSE via an interface called mca (an inter-CSE-AE (Application Entity) interface) (e.g., see NPL 1, 2).

CITATION LIST

Non Patent Literature

[NPL 1] Nassim DENNOUNI, Ahmed LEHIRECHE, Towards a spatiotemporel model for the interworking of the GIS

[NPL 2] oneM2M Specification TS-0004 version 3.0.1

SUMMARY OF THE INVENTION

Technical Problem

Now, the current state of IoT interworking will be described. The current state is that IoT data is managed in an extremely siloed manner (silos) for each business operator that has collected data (data provider), and the API (Application Programming Interface) and data model for each IoT-PF unique to each business operator differ from each other.

For example, a case where be described where a high-level traffic congestion prediction service is smoothly provided by a complex data utilization app, on the basis of meteorological data for example, that is provided by a first business operator, traffic flow data that is provided by a second business operator, and event schedule data that is provided by a third business operator.

In this case, the meteorological data is provided to the complex data utilization app via an IoT-PF and API/data model that are unique to the first business operator. The traffic flow data is provided to the complex data utilization app via an IoT-PF and API/data model that are unique to the second business operator. The event schedule data is provided to the complex data utilization app via an IoT-PF and API/data model that are unique to the third business operator.

In such a case, there is a need for all APIs and data models for each data provider to be individually continuously supported, and continuous data utilization is difficult.

As described above, IoT data is managed in an extremely siloed manner for each IoT-PF business operator that has collected the data, but the possibility of APIs and data models (including data structure and vocabulary) being unified among the various types of PFs is extremely low.

Also, there is a possibility that a plurality of business operators will realize edge PFs. APIs differ depending on whether in the cloud or at the edge, and there is diversification. Accordingly, portability of apps deteriorates.

Now, factors impeding creation of various types of apps that utilize IoT data will be described.

In order for data that each of a plurality of types of PFs holds to be utilized, providers of the various types of apps need to learn the API and data model for each PF/each device, which creates a great load.

Accordingly, if the number of types of PFs is in the tens or more, for example, handling thereof is extremely difficult. Also, in order to judge whether or not there is value in cooperating certain data, data needs to be acquired for a trial, but this trial also creates a considerable load.

In order to deal with the above, there is a need to establish a technology where app providers do not have to individually handle each PF and each device, where interworking can be realized in a short time and at low costs, and where development of sustained data utilization is promoted.

Next, issues regarding IoT interworking by Specific Interworking (IWK) will be described.

There is a technique called Specific IWK in which, at the time of data exchange being performed among different types of standards, abstraction of data expression is not performed, and data is converted one at a time to create an exchange flow.

For example, the following (1) through (3) can be listed as Specific IWK in which data conversion is performed from IoT standards A, B, and C, into a common PF.

(1) A conversion proxy between a standard A_Device and the common PF includes standard-dependent I/O conversion, and Data Mapping A unique to the standard A and IWK Procedures A unique to the standard A (2) A conversion proxy between a technology B PF and the common PF includes standard-dependent I/O conversion, and Data Mapping B unique to the standard B and IWK Procedures B unique to the standard B (3) A conversion proxy between a standard C PF and the common PF includes standard-dependent I/O conversion, and Data Mapping C unique to the standard C and IWK Procedures C unique to the standard C Next, issues regarding Specific IWK will be described from a. through c. below.

a. First, escalation of developing costs can be cited. In order for data to be exchanged, there is a need to comprehensively understand knowledge such as the relationship between the data structure of the standard and the device, correlation of data and resources of the common platform, and mapping flow and so forth.

At a certain scale and beyond, accumulating knowledge regarding all data and preparing a data exchange flow become substantially difficult.

When desiring to perform data exchange with a new standard, a flow for data mapping and data exchange needs to be newly created, and accordingly an increase in standards that are interworking causes development costs to escalate.

b. Individually-decided data mapping causes the data structure of the common platform to be diversified as well, and individual data structures have to be comprehended when acquiring data by a data utilization app as well.

c. Customization of the data storage state and location needs to be performed individually for each standard.

The present invention has been made in light of the above situation, and it is an object thereof to provide an information processing system, method, and program, where data exchange can be performed by interworking in a short time and at low costs, and without individually handling each standard of the data.

Means for Solving the Problem

In order to achieve the above object, an aspect of an information processing system according to an embodiment of this invention is an information processing system including a conversion proxy that is connected to devices corresponding to a plurality of types of unique standards, and further connected to a common platform server that performs data exchange with applications. The conversion proxy includes an acquisition unit that acquires ontology data described in an ontology with a data structure corresponding to the unique standards, a device management unit that acquires and manages unique device information correlated with devices corresponding to the plurality of types of unique standards, and a common exchange unit that creates a resource in which a data structure common to the plurality of types of unique standards and a data exchange interface corresponding to the unique standards are correlated, on the basis of the ontology data acquired by the acquisition unit and the device information managed by the device management unit, and performs data exchange with the common platform server using the created resource.

An aspect of an information processing method according to an embodiment of this invention is an information processing method performed by an information processing system including a conversion proxy that is connected to devices corresponding to a plurality of types of unique standards, and further connected to a common platform server that performs data exchange with applications. The conversion proxy acquires ontology data described in an ontology with a data structure corresponding to the unique standards, acquires and manages unique device information correlated with devices corresponding to the plurality of types of unique standards, and creates a resource in which a data structure common to the plurality of types of unique standards and a data exchange interface corresponding to the unique standards are correlated, on the basis of the ontology data that is acquired and the device information that is managed, and performs data exchange with the common platform server using the created resource.

Effects of the Invention

According to an aspect of the present invention, data exchange can be performed by interworking in a short time and at low costs, and without individually handling each standard of the data that has been collected.

DESCRIPTION OF EMBODIMENTS

An embodiment of this invention will be described below with reference to the figures.

In the information processing system according to an embodiment of the present invention, data mapping and data exchange that conventionally was performed in a one-on-one manner for each data are abstracted by using ontology, and processing is commonalized with regard to abstracted entities.

Accordingly, processing is decided in abstracted increments, realizing reduction in development costs of data mapping and data exchange flow, and unification of methods for data acquisition by apps.

Thus, operators of data distribution platforms can complete platform settings with low development costs. From the perspective of data utilization apps, the configuration of data on a common PF is commonalized. Accordingly, the way in which data utilization apps acquire data is unambiguously decided, and development and modification of apps also becomes easier.

Also, in the information processing system according to an embodiment of the present invention, data storage states and data storage locations are divided into patterns, a processing flow is set for each pattern, and switching of data exchange formats is realized in the above-described abstracted increments.

Accordingly, data storage is optimized by simple settings, and performance of the platform is maintained.

Next, sophistication of IoT interworking using ontology will be described.

In an embodiment of the present invention, data expressions extending across different types of standards are structured by ontology, and a data exchange flow common to highly-abstracted data expressions is designed. Accordingly, processing of data exchange between different types of standards and oneM2M is commonalized.

Figure 1:
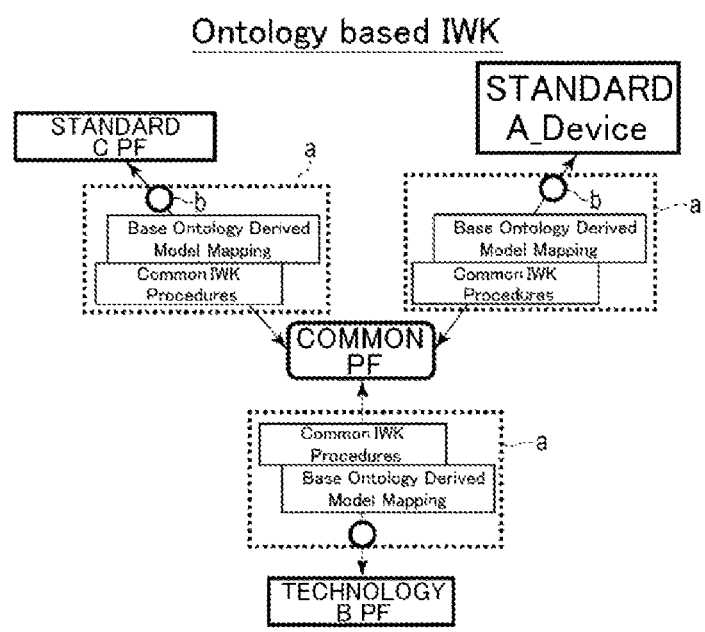
FIG. 1 is a diagram illustrating an example of Ontology based IWK that is applied to an information processing system according to an embodiment of the present invention.

FIG. 1 is a diagram illustrating an example of Ontology based IWK that is applied to the information processing system according to an embodiment of the present invention.

In the example of the Ontology based IWK illustrated in FIG. 1, the following three conversion proxies each include, in addition to standard-dependent I/O conversion that is dependent on the standard, common Base Ontology Derived Model Mapping and Common IWK Procedures. This Ontology based IWK here performs conversion of data from the IoT standards A, B, and C, to a common PF by oneM2M. These three conversion proxies are a conversion proxy between the standard A_Device and the common PF, a conversion proxy between the technology B PF and the common PF, and a conversion proxy between the standard C PF and the common PF. The a's shown in FIG. 1 denote the conversion proxies, and the b's shown in FIG. 1 denote standard-dependent I/O conversion.

Figure 2:
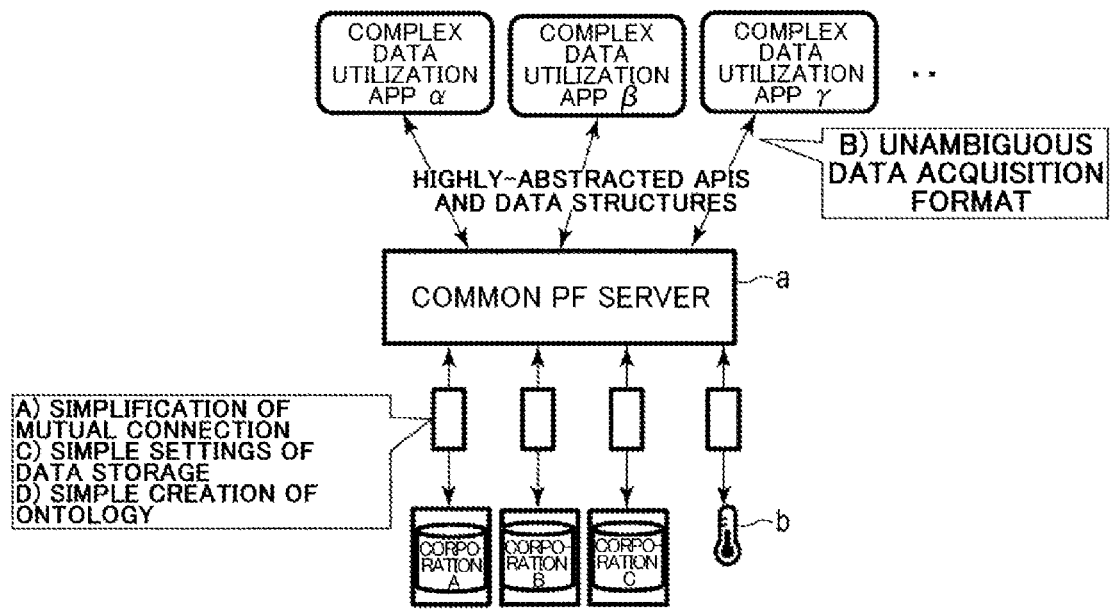
FIG. 2 is a diagram illustrating a configuration example of Ontology based IWK applied to the information processing system according to an embodiment of the present invention.

FIG. 2 is a diagram illustrating a configuration example in which Ontology based IWK is applied to the information processing system according to an embodiment of the present invention.

In the example illustrated in FIG. 2, a Corporation A IoT-PF is connected to a common PF server via an ontology creating GUI (graphical user interface) and conversion proxy that support the Corporation A IoT-PF.

In the example illustrated in FIG. 2, a Corporation B IoT-PF is connected to the common PF server via an ontology creating GUI and conversion proxy that support the Corporation B IoT-PF.

In the example illustrated in FIG. 2, a Corporation C IoT-PF is connected to the common PF server via an ontology creating GUI and conversion proxy that support the Corporation C IoT-PF.

In the example illustrated in FIG. 2, a sensor device is connected to the common PF server via an ontology creating GUI and conversion proxy that support the standard of a source providing the sensor device.

The common PF server realizes highly-abstracted APIs and data structures among various types of apps, such as a complex data utilization app α, a complex data utilization app β, a complex data utilization app γ, and so forth, and exchanges data. The a shown in FIG. 2 denotes the conversion proxies and ontology creating GUIs, and the b shown in FIG. 2 denotes the sensor device.

Next, the effects of Ontology based IWK will be described.

In the configuration illustrated in FIG. 2, the processing of the common PF, Base Ontology Derived Model Mapping, and Common IWK Procedures, illustrated in FIG. 1, is commonalized, and accordingly there is no need for the Base Ontology Derived Model Mapping and Common IWK Procedures to be developed for each business operator. Thus, development costs of conversion proxies when the number of technical standards increases can be reduced.

Also, from the perspective of various types of data utilization apps, the configuration of data processed by the common PF is commonalized. Accordingly, the way in which data utilization apps acquire data is unambiguously decided, and development and modification of apps also becomes easier.

Also, data storage is optimized by simple settings, and performance of the platform can be maintained.

Figure 3:
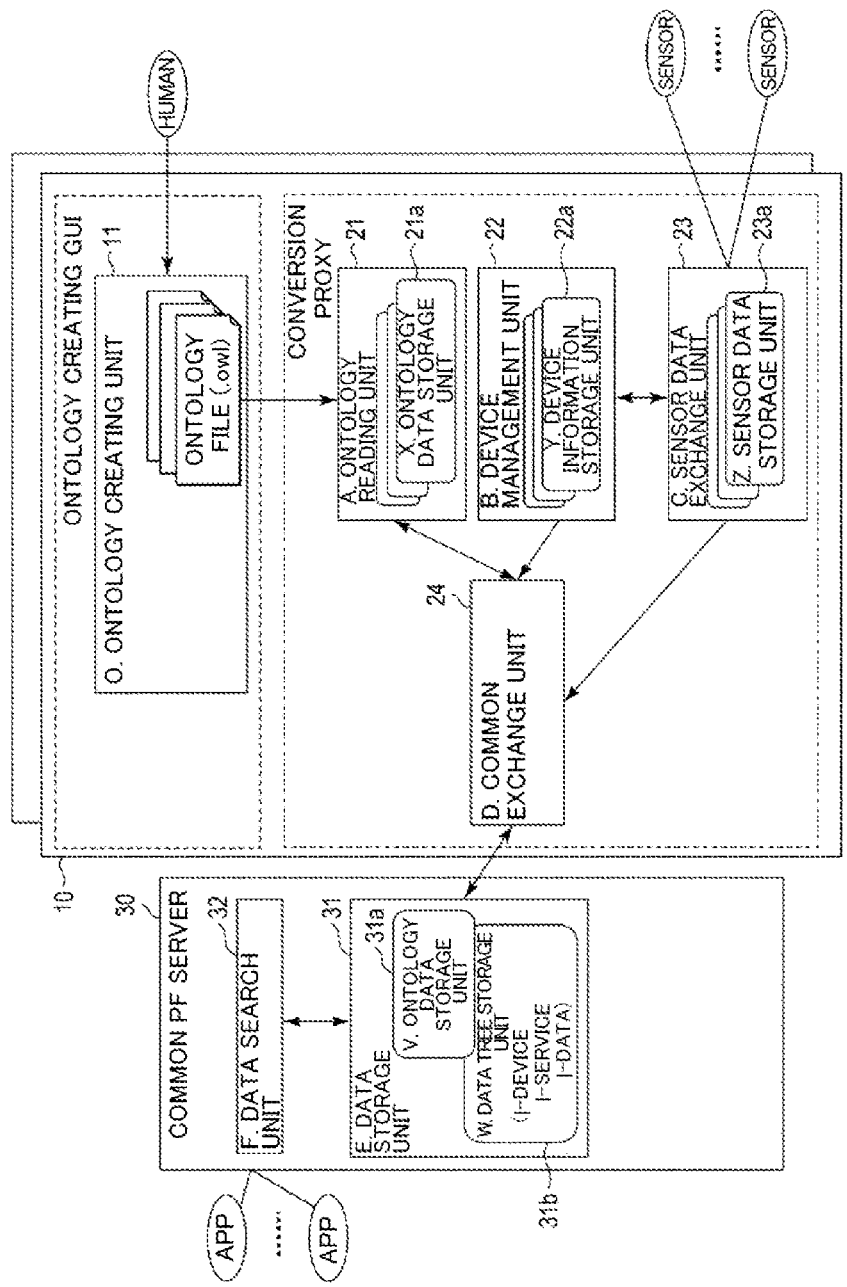
FIG. 3 is a diagram illustrating a configuration example of the information processing system according to an embodiment of the present invention.

FIG. 3 is a diagram illustrating a configuration example of the information processing system according to an embodiment of the present invention.

In the information processing system according to an embodiment of the present invention, a data processing device 10 provided corresponding to each business operator is connected to each of devices such as sensors and the like corresponding to a plurality of types of unique standards, and a common PF server 30 that performs data exchange with applications, via a communication network, as illustrated in FIG. 3.

The data processing device 10 is provided for each of the above standards, and is connected to devices corresponding to the relevant standard. The functions of the data processing device 10 and the common PF server 30 are realized using a processor such as a CPU (Central Processing Unit) or the like that executes programs, and storage media such as RAM (Random Access Memory), ROM (Read Only Memory), and so forth, an input device such as a keyboard or the like, and a display device such as a display or the like.

The data processing device 10 has an ontology creating GUI and a conversion proxy.

The ontology creating GUI has an ontology creating unit (may be written as O, ontology creating unit) 11.

The conversion proxy has an ontology reading unit (may be written as A, ontology reading unit) 21, a device management unit (may be written as B, device management unit) 22, a sensor data exchange unit (may be written as C, sensor data exchange unit) 23, and a common exchange unit (may be written as D, common exchange unit) 24.

The ontology reading unit 21 acquires ontology data in which the data structure corresponding to the unique standard is described by ontology. The ontology reading unit 21 has an ontology data storage unit (may be written as storage unit X) 21a.

The device management unit 22 acquires device information unique to the device corresponding to the unique standard, and manages this device information. The device management unit 22 has a device information storage unit (may be written as storage unit Y) 22a.

Sensors, devices, and PFs of a business operator are connected to the sensor data exchange unit 23. The sensor data exchange unit 23 has a sensor data storage unit (may be written as storage unit Z) 23a.

The common exchange unit 24 creates resources where a data structure common to a plurality of types of unique standards and a data exchange interface corresponding to unique standards are correlated, on the basis of ontology data acquired by the ontology reading unit 21 and device information managed by the device management unit 22. The common exchange unit 24 performs data exchange with the common PF server 30 using these resources.

The common PF server 30 is provided as one server common to the standards, and has a data storage unit (may be written as E, data storage unit) 31 and a data search unit (may be written as F, data search unit) 32.

The data storage unit 31 has an ontology data storage unit (may be written as storage unit V) 31a where an ontology file (.owl (Web Ontology Language)) in which the data structure is described is stored, and a data tree storage unit (may be written as storage unit W) 31b. The data tree is configured of "l-device", "l-service", "l-data", and so forth, for example.

The ontology reading unit 21, the device management unit 22, the common exchange unit 24, the data storage unit 31, and the data search unit 32 may be provided in common among the various types of standards, and the sensor data exchange unit 23 is provided for each standard.

Next, the functions of input/output of each unit will be described below.

A, ontology reading unit
Input: owl file created by GUI
Output: ontology entity relation map (relation between Device and Service, and between Service and DataPoint)

B, device management unit
Input: sensor output (in case of sensor connection), PF Device Discovery API (in case of PF connection)
Output: device information map ({Device ID, Device Name})

C, sensor data exchange unit
Input: Data Discovery API (value described under Service and DataPoint entity in ontology)
Output: sensor data (temperature: 37° C., humidity 50%, etc.), command (switchON . . . )

D, common exchange unit
Input: device information from device management unit, sensor data from sensor data exchange unit
Output: data exchange request to server (resource creation, data update, etc.)

E, data storage unit
Input: data exchange request from conversion proxy, from common exchange unit
Output: resource creation F, data search unit
Input: SPARQL (one type of RDF (Resource Description Framework) query language) query
Output: data acquisition URI (Uniform Resource Identifier), data value O, ontology creating unit
Input: manual input
Output: ontology (.owl) for IWK Next, Base Ontology (oneM2M) will be described.

In an embodiment of the present invention, abstraction of data structures of various different types of standards is performed by using oneM2M Base Ontology, information of abstracted data structures is described in a machine-readable form by using RDF, knowledge of relationship of data and device and so forth is structured as metadata, and data information is correlated.

Figure 4:
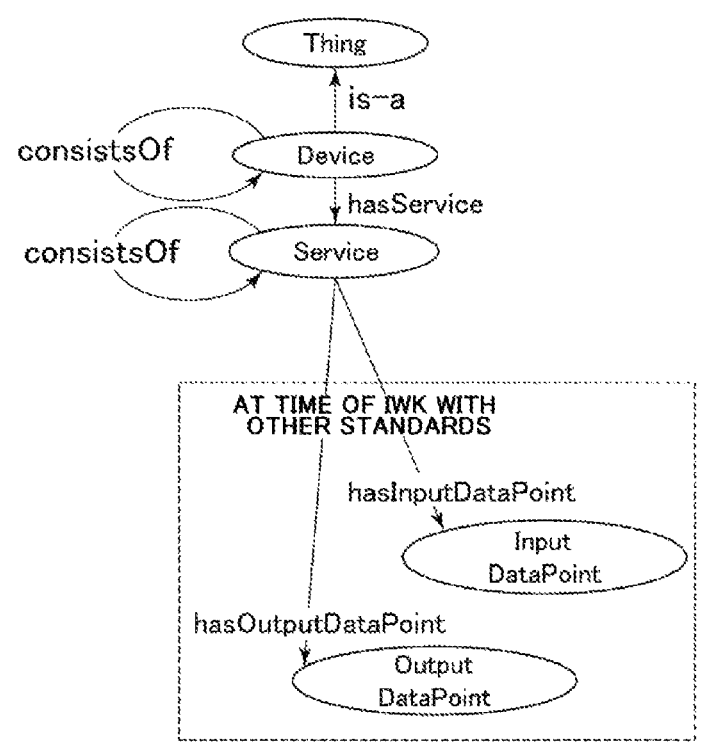
FIG. 4 is a diagram illustrating an example of a part of oneM2M base ontology used in the information processing system according to an embodiment of the present invention.

FIG. 4 is a diagram illustrating an example of part of oneM2M base ontology used in the information processing system according to an embodiment of the present invention.

In the example illustrated in FIG. 4, a situation is assumed where an IoT device resource exchanges data at the time of IWK with another standard via a service resource (may be written as service). In a case of a different type of standard having a RESTful interface, a DataPoint resource (may be written as DataPoint) is defined in lower layer of service resource.

In this example, classes "Device" and "Service" are correlated by property "hasService", classes "Service" and "OutputDataPoint" are correlated by property "hasOutputDataPoint", classes "Service" and "InputDataPoint" are correlated by property "hasInputDataPoint", and classes "Device" and "Thing" are correlated by property "is-a".

In a case where complicated IoT devices are used, child devices and child services are expressed using "ConsistsOf" fields to define hierarchical relations, as illustrated in FIG. 4.

Figure 5:
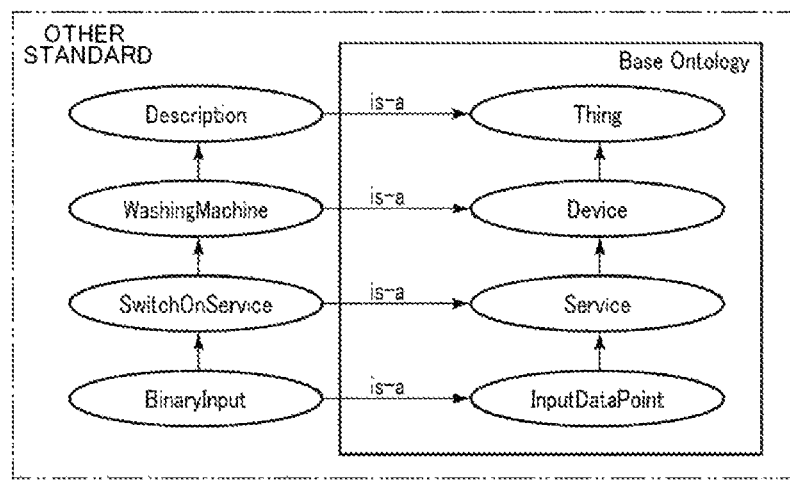
FIG. 5 is a diagram illustrating an example of abstraction of a data structure.

FIG. 5 is a diagram illustration an example of abstraction of a data structure. For different types of standards of RPC (Remote Procedure Call) interfaces, an Operation the same as the function of the RPC is defined.

For example, there is a service resource called "switch (SwitchOnService)" for a device resource called "washing machine", as illustrated in FIG. 5. In a case of using DataPoint, switching On/Off operations are performed by InputDataPoint, and the current state of the switch is obtained from OutputDataPoint.

Next, four forms relating to saving and acquisition of data in IoT mutual connection (Forms 1. through 4.) will be described below.

Form 1. (basic form): Newest value at common PF is updated (only newest value is saved).
Form 2. (extended form): Time-series data (Time Series) is accumulated at common PF (time-series data accumulation).
Form 3. (extended form): Data is acquired from an other-standard PF/Device only when requested by app (acquisition on demand).
Form 4. (extended form): Data accumulated at an other-standard PF/Device is acquired in batch when requested by app (batch acquisition on demand).

(Form 1.)

Figure 6:
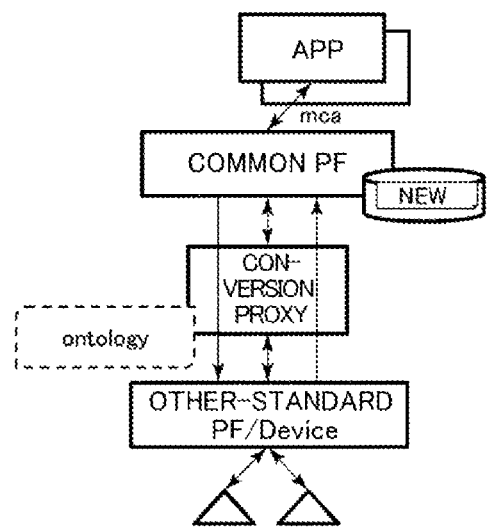
FIG. 6 is a diagram describing saving only a newest value.

Next, details of "Form 1.: Updating Newest Value to Common PF" which is the basic form will be described. FIG. 6 is a diagram describing saving only the newest value.

Issues at the time of a newest value being updated at a common PF will be described. To begin with, an object of OBI (Ontology Based Interworking) of oneM2M is to reduce the amount of coding when allowing connection of data of another standard (a standard that is unique to the data provider). However, the content set forth in the specification alone does not go beyond matching the resource structure, and in practice a great amount of coding at the device becomes necessary.

Accordingly, the technology of Form 1. uses <Protocol:hasAPI> and adds an API for connecting to data of other standards to the ontology, thereby absorbing portions that had to be coded at each device by the ontology. This dramatically reduces the amount of coding.

Figure 7:
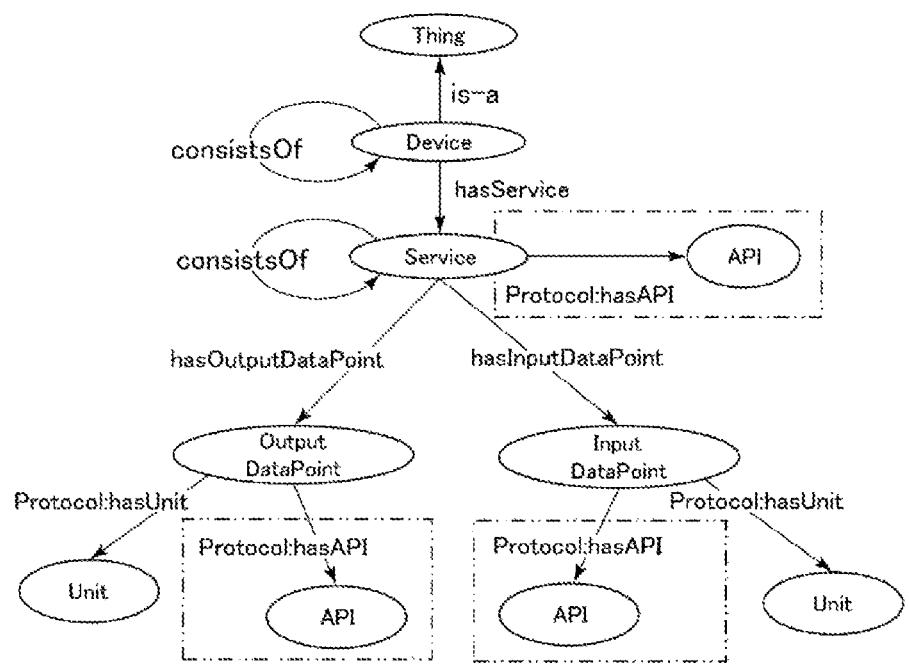
FIG. 7 is a diagram describing an example of an ontology extended field.

Next, the ontology extended field in Form 1. will be described. FIG. 7 is a diagram for describing an example of the ontology extended field.

In Form 1., correlation of the ontology of an abstracted data structure and a data exchange interface corresponding to another standard is performed, using a metadata field "standard name:hasAPI" in which storing the newest data from a device of another standard in the common PF server 30 is defined, as illustrated in FIG. 7.

For example, a metadata field "standard name:hasAPI" (eg: DWAPI (Device Web API):hasAPI) is designed as a metadata field by which an other-standard interface (API) for DataPoint transmission and reception is correlated with a DataPoint instance in the ontology. This DataPoint instance here includes the classes "OutputDataPoint and "InputDataPoint" to which the instance belongs.

The same metadata field can also be used to describe APIs for when services of other standards are called up. The metadata field "standard name:hasUnit" is then designed, and increments of data defined in other standards are described in the ontology, to facilitate efficient understanding of the data at the upper layer.

In the example illustrated in FIG. 7, the classes "Device" and "Service" are correlated by a property "hasService", the classes "Service" and "OutputDataPoint" are correlated by a property "hasOutputDataPoint", the classes "Service" and "InputDataPoint" are correlated by a property "hasInputDataPoint", and the classes "Device" and "Thing" are correlated by a property "is-a", as illustrated in FIG. 4.

The class "OutputDataPoint" is correlated with the class "Unit" by the metadata field "Protocol:hasUnit", and the class "InputDataPoint" is correlated with the class "Unit" by the metadata field "Protocol:hasUnit", in Form 1.

Also, the class "Service" is correlated with the class "Unit" by the metadata field "Protocol:hasAPI", the class "OutputDataPoint" is correlated with the class "Unit" by the metadata field "Protocol:hasAPI", and the classes "Service" and "InputDataPoint" are correlated with the class "Unit" by the metadata field "Protocol:hasAPI".

Figure 8:
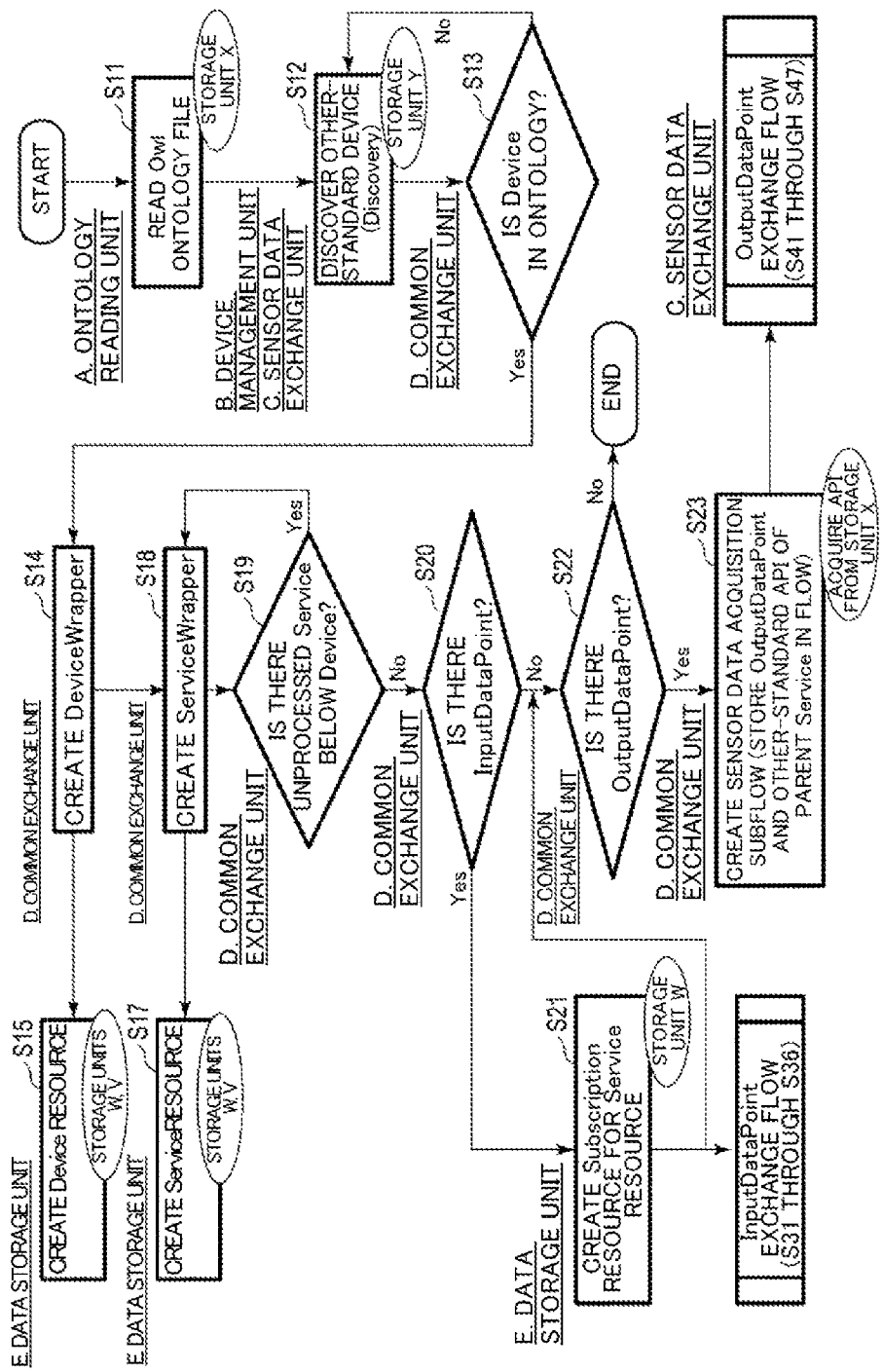
FIG. 8 is a diagram describing an example of a workflow at the time of conversion proxy connection.
Figure 9:
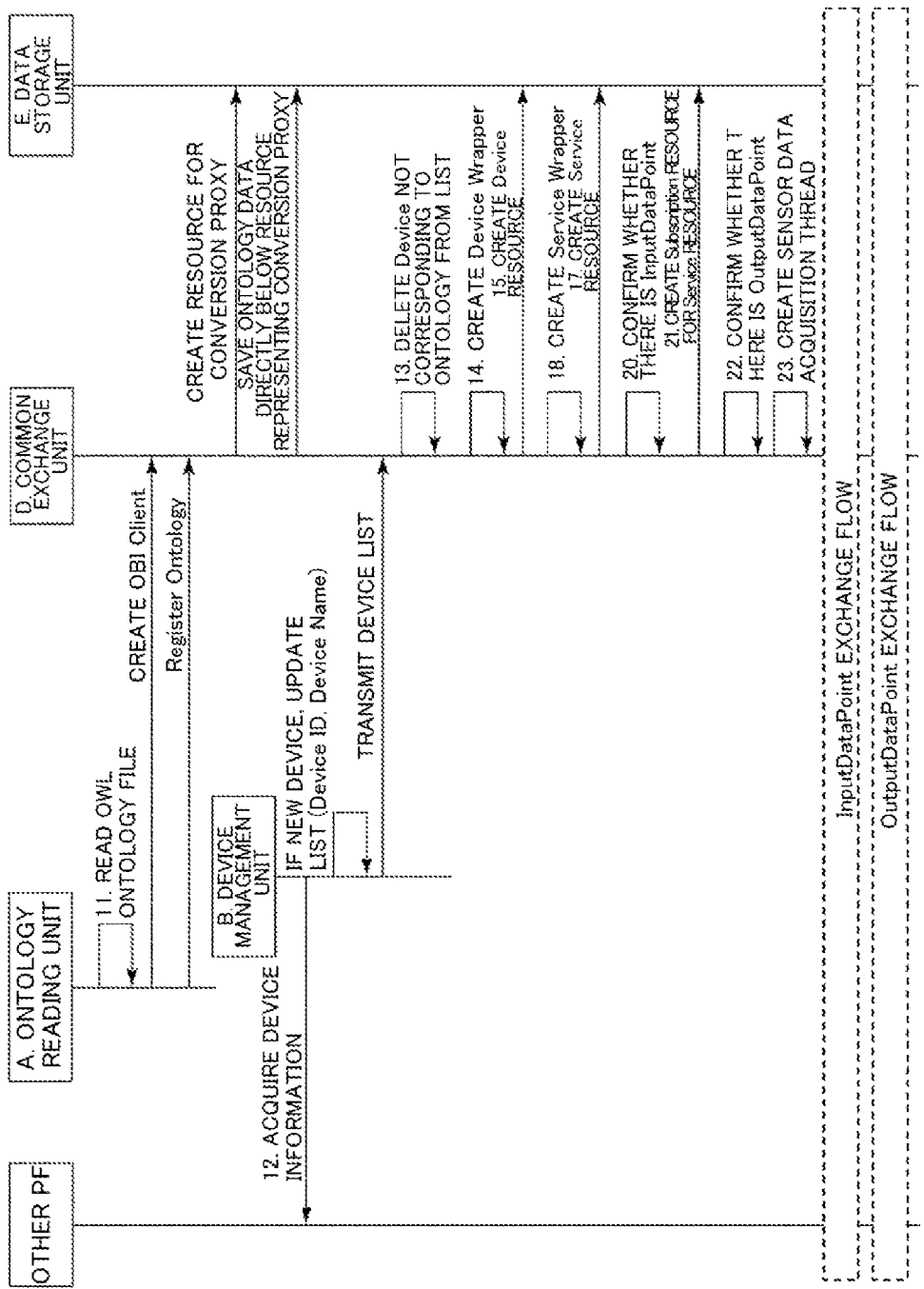
FIG. 9 is a diagram describing an example of a sequence at the time of conversion proxy connection.

Next, the workflow at the time of conversion proxy connection will be described. FIG. 8 is a diagram describing an example of the workflow at the time of conversion proxy connection. FIG. 9 is a diagram describing an example of a sequence at the time of conversion proxy connection. This workflow and sequence are common to Forms 1. through 4.

In this workflow, the conversion proxy reads in the ontology, and processing common to Device/Service/InputDataPoint/OutputDataPoint is performed in accordance with the content of the ontology.

First, the ontology reading unit 21 reads the ontology file created by the ontology creating unit 11, and stores this ontology file in the storage unit X (S11).

At this time, the ontology reading unit 21 creates an OBI Client for the common exchange unit 24, and Registers the ontology. The common exchange unit 24 creates a resource for the conversion proxy, and sends this resource to the data storage unit 31 of the common PF server 30. The common exchange unit 24 also stores the ontology data directly below the resource representing the conversion proxy, with the storage unit Y as the storage destination.

The device management unit 22 acquires device information from an other-standard PF/Device (S12), and if the device indicated by this device information is a new device, updates a device list {Device ID, Device Name}, and transmits this device information to the common exchange unit 24.

Next, the common exchange unit 24 determines whether or not the Device indicated by the device information acquired from the device management unit 22 is in the ontology (S13), and if this Device is not in the ontology (No in S13), determines that the Device indicated by the device information does not correspond to the ontology, and deletes the information relating to this Device from the device list.

Conversely, if the Device indicated by the device information is in the ontology (Yes in S13), the common exchange unit 24 creates a Device Wrapper, and stores this Device Wrapper in the storage units W and V of the data storage unit 31 (S14).

The data storage unit 31 uses the Device Wrapper to create a Device resource, which is a type of conversion proxy resource, and stores this resource in the storage units W and V in the data storage unit 31 (S15).

Next, following S14, the common exchange unit 24 creates a Service Wrapper, and stores this Service Wrapper in the storage units W and V of the data storage unit 31 (S18). The data storage unit 31 uses the Service Wrapper to create a Service resource, which is a type of conversion proxy resource, and stores this resource in the storage units W and V of the data storage unit 31 (S17).

Next, the common exchange unit 24 determines whether or not there is an unprocessed Service resource in the layer that is below the Device resource in the ontology (S19), and if there is an unprocessed Service resource (Yes in S19), transitions to S18.

Also, if there is no unprocessed Service resource (No in S19), the common exchange unit 24 confirms whether or not there is an InputDataPoint (S20), and if there is an InputDataPoint (Yes in S20), creates a Subscription resource in the layer that is below the Service resource, and stores this resource in the storage unit W of the data storage unit (S21).

A Subscription resource is a type of data resource of the common PF. When a Subscription resource is placed in a layer that is below another resource (eg: Service resource), a notification is sent when that resource is updated. The notification destination is described in the Subscription resource.

Following S21, the flow transitions to S22 and a later-described InputDataPoint exchange flow (S31 through S36).

If there is no InputDataPoint (No in S20), the common exchange unit 24 confirms whether or not there is an OutputDataPoint (S22), and if there is no OutputDataPoint (No in S22), the processing ends.

Conversely, if there is an OutputDataPoint (Yes in S22), the common exchange unit 24 creates a sensor data acquisition subflow (the OutputDataPoint, and an other-standard API of a parent Service obtained from the storage unit X, are stored in a workflow) (S23).

Following S23, the flow transitions to a later-described OutputDataPoint exchange flow (S41 through S47).

Figure 10:
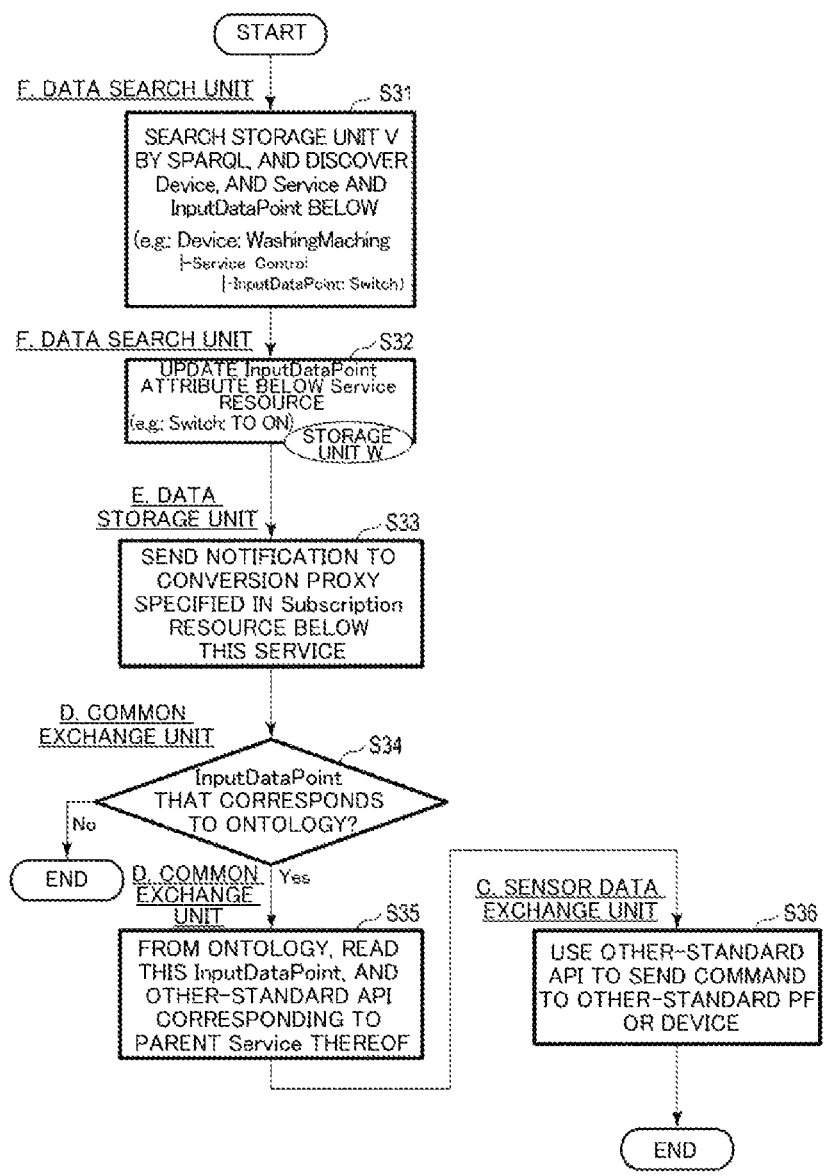
FIG. 10 is a diagram illustrating an example of a workflow of InputDataPoint exchange.
Figure 11:
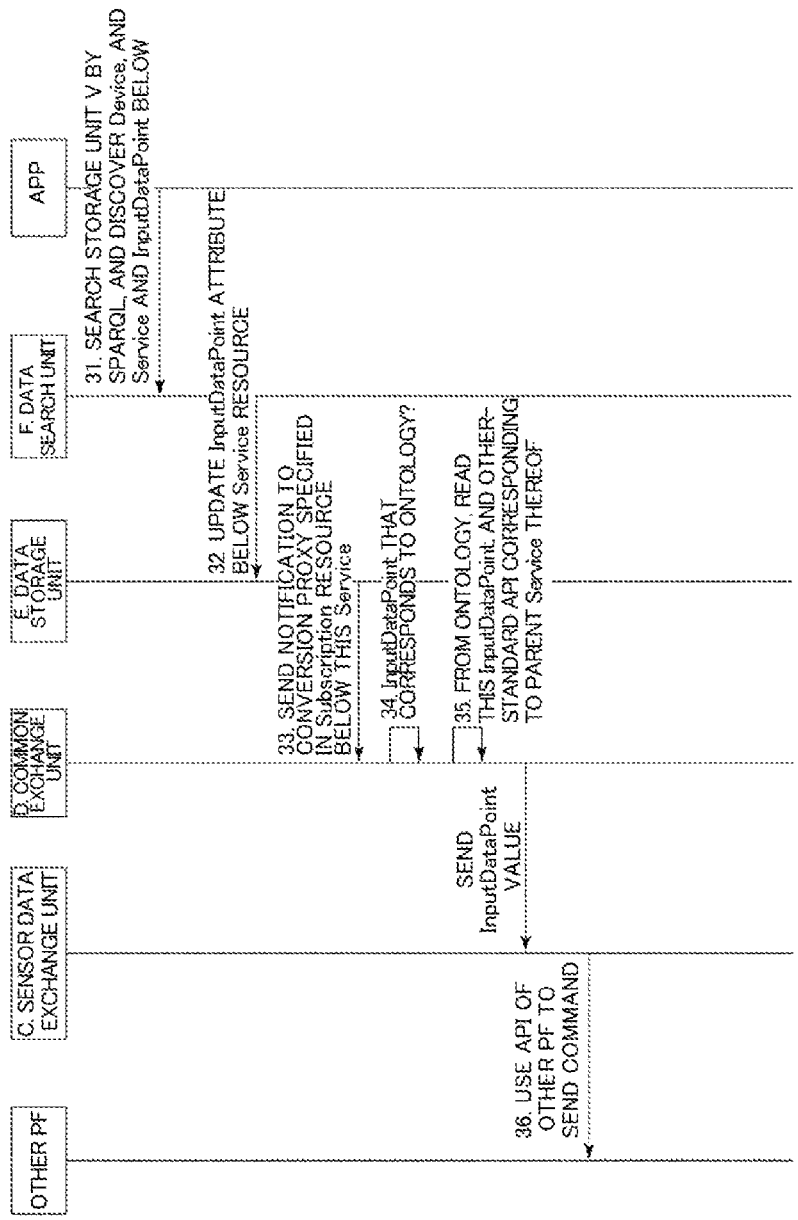
FIG. 11 is a diagram illustrating an example of a sequence of InputDataPoint exchange.

The InputDataPoint exchange flow will be described. FIG. 10 is a diagram illustrating an example of a workflow for InputDataPoint exchange, and FIG. 11 is a diagram illustrating an example of a sequence for InputDataPoint exchange. These workflow and sequence are common to Forms 1. through 4.

In InputDataPoint exchange, processing that is common to InputDataPoint (sending data/commands to an other-standard PF or device) is performed, using the other-standard API described in the ontology.

First, under a SPARQL from an app, the data search unit 32 of the common PF server 30 searches the storage unit V of the data storage unit 31, and discovers a Device, and Service and InputDataPoint below this Device (e.g.: "Device: WashingMaching", "|-Service: Control", "|-InputDataPoint: Switch") (S31).

The data search unit 32 updates the InputDataPoint attribute in the layer that is below the Service resource (e.g.: Switch: to ON) in the storage unit W of the data storage unit 31 (S32).

The data storage unit 31 sends a notification to the conversion proxy specified in the Subscription resource in the layer that is below this service resource (S33).

The common exchange unit 24 of the conversion proxy determines whether or not the above InputDataPoint is an InputDataPoint that corresponds to the ontology (S34), and if not an InputDataPoint corresponding to the ontology (No in S34), the processing ends.

Conversely, if the InputDataPoint is an InputDataPoint corresponding to the ontology (Yes in S34), the common exchange unit 24 reads, from the ontology, this InputDataPoint, and an other-standard API corresponding to the parent Service thereof, and sends the results of reading to the sensor data exchange unit 23 (S35).

The sensor data exchange unit 23 then uses the other-standard API to send a command to the other-standard PF or device (S36).

Figure 12:
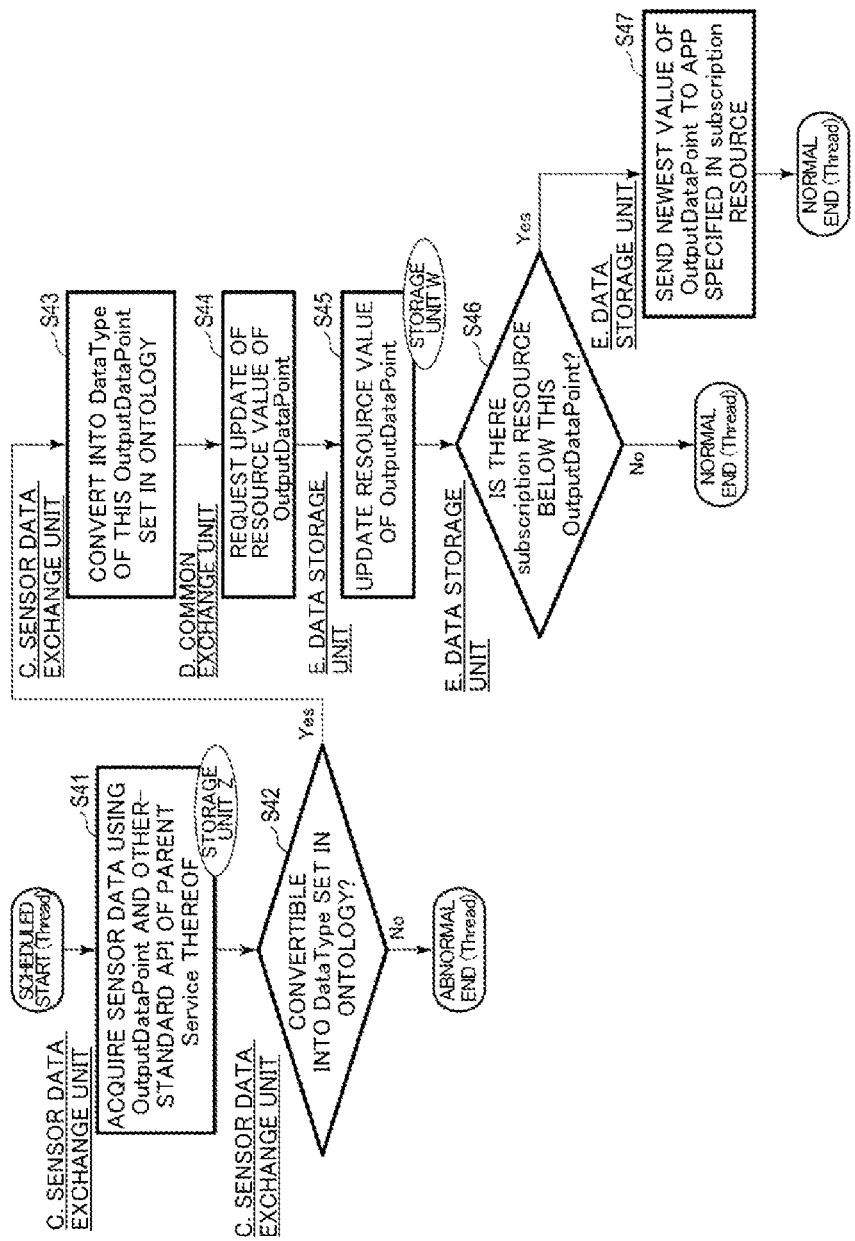
FIG. 12 is a diagram illustrating an example of a workflow of OutputDataPoint exchange.
Figure 13:
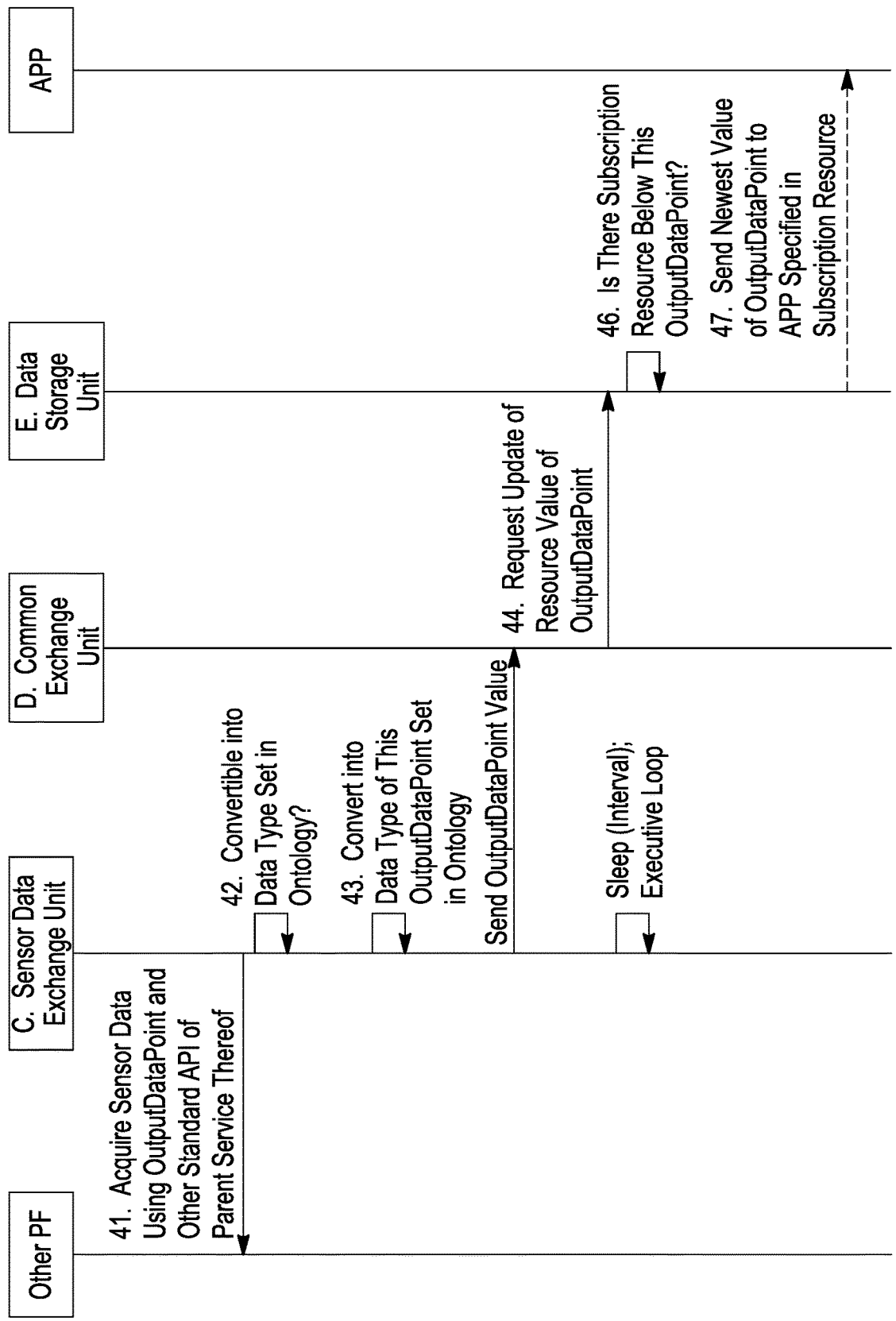
FIG. 13 is a diagram illustrating an example of a sequence of OutputDataPoint exchange.

The OutputDataPoint exchange flow will be described. FIG. 12 is a diagram illustrating an example of a workflow of OutputDataPoint exchange, and FIG. 13 is a diagram illustrating an example of a sequence of OutputDataPoint exchange. These workflow and sequence are common to Forms 1. through 4.

In OutputDataPoint exchange, processing that is common to OutputDataPoint (acquiring data/commands from an other-standard PF or device) is performed, using the other-standard API described in the ontology.

After a scheduled start (Thread), the sensor data exchange unit 23 acquires sensor data from the storage unit Z, using the OutputDataPoint and an other-standard API of the parent Service thereof (S41).

The sensor data exchange unit 23 determines whether or not the sensor data can be converted into a DataType set in the ontology (S42), and if not convertible (No in S42), an abnormal end (Thread) occurs.

If convertible (Yes in S42), the sensor data exchange unit 23 converts the sensor data into the DataType of this OutputDataPoint set in the ontology, and sends the OutputDataPoint value to the common exchange unit 24 (S43).

The common exchange unit 24 requests the data storage unit 31 to update the resource value of the OutputDataPoint (S44).

The data storage unit 31 updates the resource value of the OutputDataPoint in the storage unit W (S45).

The data storage unit 31 judges whether or not there is a subscription resource below this OutputDataPoint (S46).

If this subscription resource does not exist (No in S46), a normal end (Thread) occurs.

Also, if this subscription resource exists (Yes in S46), the data storage unit 31 sends the newest value of the OutputDataPoint to the app specified in the subscription resource (S47), and a normal end (Thread) occurs.

Next, an Example regarding which all data exchange flows are performed following ontology settings will be described by way of an example of a device called an "environment monitoring sensor" (conforming to DWAPI standard).

Figure 14:
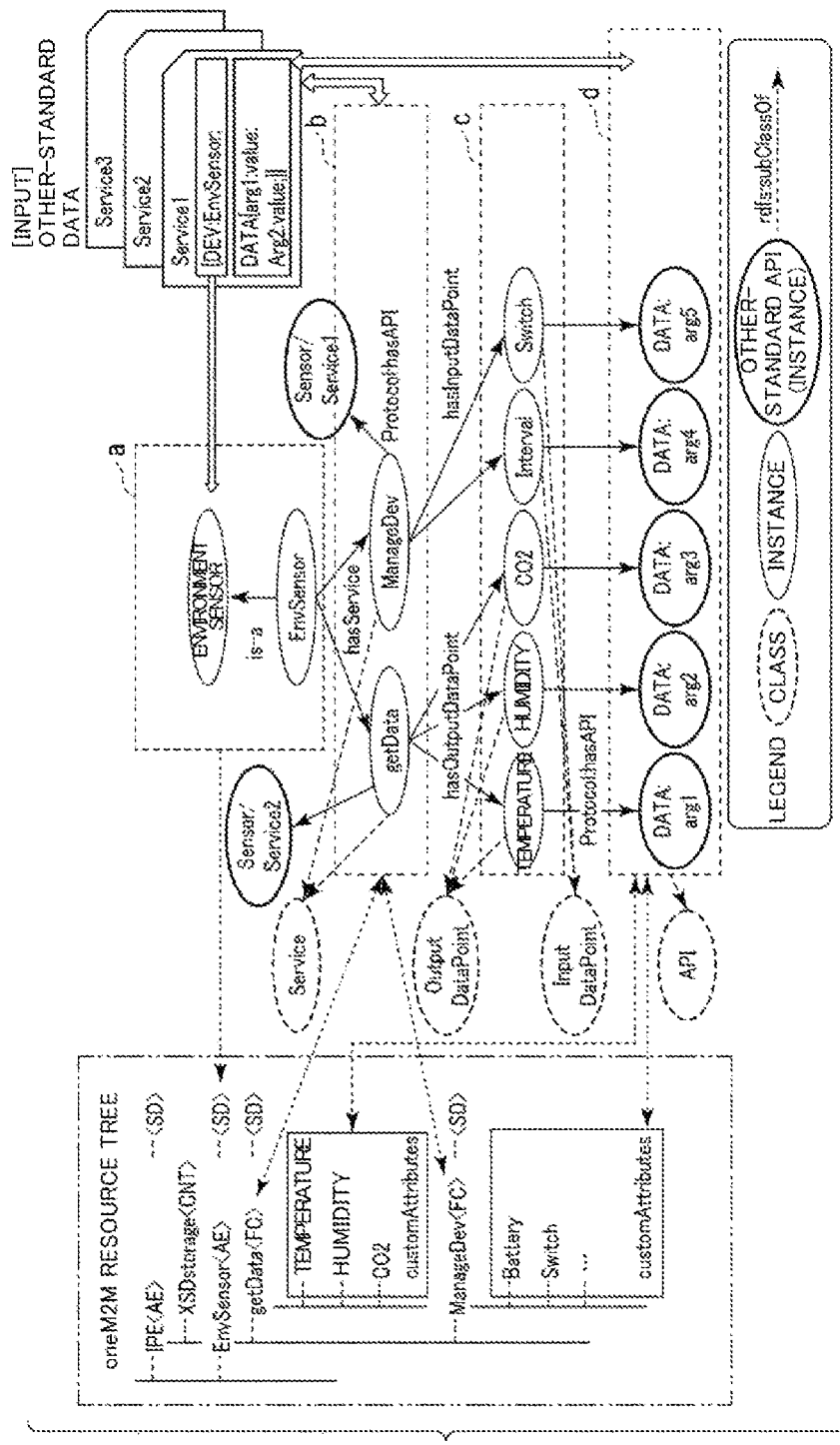
FIG. 14 is a diagram describing an example of commonalization of a data exchange flow with another standard.

FIG. 14 is a diagram for describing an example of commonalization of a data exchange flow with another standard.

Here, a data exchange flow is designed that is commonalized with other standards, and is not restricted by various types of data structures.

In the example illustrated in FIG. 14, instances "getData" and "ManageDev" belong to class "Service", instances "temperature", "humidity", and "CO2" belong to class "OutputDataPoint", and instances "Interval" and "Switch" belong to class "InputDataPoint".

Also, instance "EnvSensor" is correlated with instances "getData" and "ManageDev" by property "hasService", instance "getData" is correlated with instances "temperature", "humidity", and "CO2" by property "hasOutputDataPoint", and instance "ManageDev" is correlated with instances "Interval" and "Switch" by property "hasInputDataPoint".

Instance "EnvSensor" is correlated with instance "environment sensor" by property "is-a". Instance "ManageDev" is correlated with other-standard API (instance) "Sensor/Service1" by property "hasAPI". Instance "getData" is correlated with other-standard API "Sensor/Service2" by property "hasAPI".

Instance "temperature" is correlated with other-standard API "DATA:arg (argument) 1" by property "hasAPI". Instance "humidity" is correlated with other-standard API "DATA:arg2" by property "hasAPI". Instance "CO2" is correlated with other-standard API "DATA:arg3" by property "hasAPI".

Instance "Interval" is correlated with other-standard API "DATA:arg4" by property "hasAPI". Instance "Switch" is correlated with other-standard API "DATA:arg5" by property "hasAPI".

The other-standard APIs "DATA:arg1", "DATA:arg2", "DATA:arg3", "DATA:arg4", and "DATA:arg5" are correlated with class "API".

First, an other-standard device discovering API is used to acquire a device list for connection. With regard to other standards for which there is no device discovering API (eg: LoRa (Long Range)), analysis is performed regarding data acquired for the first time from each device, and a field representing device type (EnvSensor) is extracted (a in FIG. 14).

Next, the SPARQL
{?Device RDFS:subClassof BO:Device} which is an RDF query language (BO therein representing Base Ontology) is used to judge whether or not a device type is present in the abstraction ontology defined in advance. If a device indicated by this device type is a device that the ontology corresponds to, a resource representing that device (device AE (Application Entity)) is created in the oneM2M-side resource tree as common processing.

Next, the services (getData and ManageDev) that the device type (EnvSensor) has are extracted by the following SPARQL
{?Device BO:hasService ?Service} (b in FIG. 14).

At the oneM2M side, a resource written as <FC>(flexContainer) is created for the extracted services. Other-standard APIs for calling up the services later for data exchange (DWAPI:Sensor/Service1, etc.) are also extracted and held.

Further, whether or not there is a corresponding OutputDataPoint is judged for each of the extracted services as in the following (a) (c in FIG. 14).
{?Service BO:hasOutputDataPoint ?o} . . . (a)

In a case where an OutputDataPoint exists, a data acquisition thread is newly created for the other-standard API of the service thereof that is stored, and preparation for data reception is performed. The other-standard API (eg: DWAPI:DATA:arg1) of each OutputDataPoint in the ontology is acquired by the metadata field (DWAPI:hasAPI) and held.

Each time data is acquired from that service, the other-standard API of the DataPoint is used, the value of each OutputDataPoint is acquired from service callup results, and the corresponding customAttribute of the oneM2M resource is updated (d in FIG. 14).

Again, whether or not there is a corresponding InputDataPoint is judged for each of the services by the SPARQL shown in the following (b).
{?Service BO:hasInputDataPoint ?i} . . . (b)

In a case where an InputDataPoint exists, a <Subscription> resource under the IPE is created at a lower layer of the <FC> resource of that service, created by oneM2M, and the IPE receives change to the value of this InputDataPoint at the oneM2M side. When change at the oneM2M side is received, the other-standard API of the corresponding InputDataPoint is used to update the other-standard device (d in FIG. 14).

The processing flow so far is highly commonalized in three abstract classes of "Device", "Service", and "DataPoint". The differences in processing of the individual instances are all defined in the ontology, and dynamically read in as parameters when executing processing and operations are performed. Processing of child devices and child services is also performed in common after extracting using the metadata field "consistsOf".

Now, providing the ontology to the AE will be described.

The data structure of the other-standard device represented by the ontology that has been created is valid knowledge to the AE at the layer above, as well. Ontology information corresponding to <SD> (Semantic Descriptor) resources at layers below oneM2M resources representing devices and services illustrated in FIG. 14 are stored following the rules (a) and (a) below, and the AE is provided with an interface relating to device-and-service discovery and data acquisition that is machine-readable, called SPARQL language.

(a) Portion between Device and Service is stored in <SD> of each device.

(b) Portion between Service and DataPoint is stored in <SD> below each service resource.

(Form 2.)

Next, details of "Form 2.: Accumulation of Time-Series Data", which is an extended form of the basic form, will be described.

Figure 15:
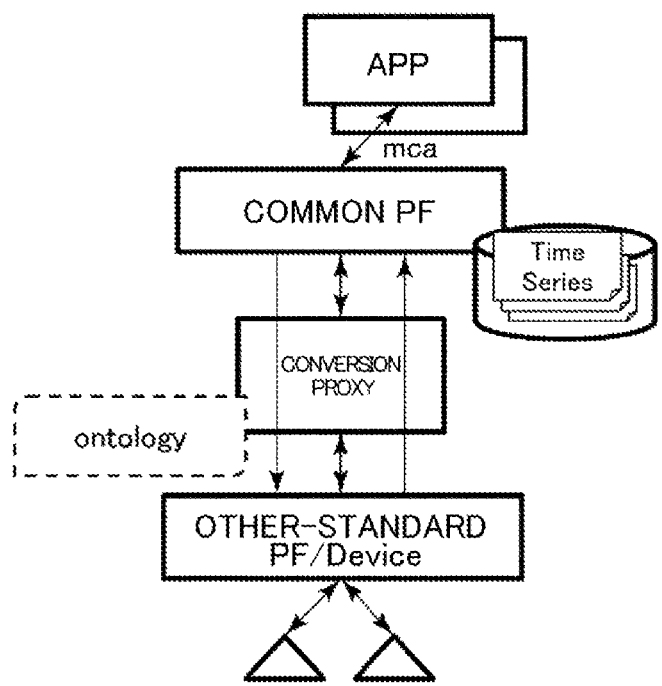
FIG. 15 is a diagram describing an example of accumulating time-series data.

FIG. 15 is a diagram describing an example of accumulating time-series data.

Issues in accumulating time-series data will be described. To begin with, only the newest values of data are saved in the common PF in OBI in oneM2M, and accordingly performing analysis that needs past time-series information (e.g., analysis such as Kalman filtering, or fault isolation by event log or the like) cannot be handled, unless data is saved at the app side.

Accordingly, the technology of Form 2. uses <Protocol: storeTimeseries>, and time-series history data is stored in the common PF by newly adding an accumulation function field for time-series data.

Figure 16:
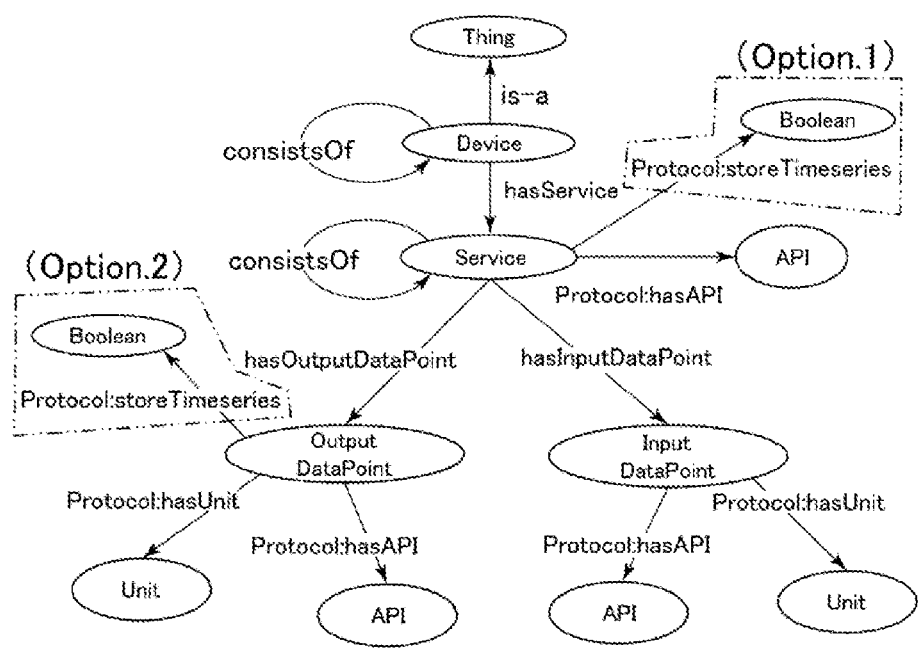
FIG. 16 is a diagram describing an example of an ontology extended field.

Next, the ontology extension field in Form.2 will be described. FIG. 16 is a diagram describing an example of an ontology extended field.

As illustrated in FIG. 16, in Form.2, a metadata field "standard name:storeTimeseries" that is defined to store time-series data from other-standard devices in the common PF server 30 is used to store time-series history data on the common PF.

In (Option.1) illustrated in FIG. 16, the metadata field "standard name:storeTimeseries" is added to Service resources, and in a case of being set to true, all OutputDataPoints under this Service resource are integrally stored in a TimeSeries resource (may be referred to as TimeSeries) on a single common PF.

In (Option.2) illustrated in FIG. 16, the metadata field "standard name:storeTimeseries" is added to OutputDataPoint, and in a case of being set to true, the values of this OutputDataPoint are stored in the TimeSeries resource in a single common PF.

The workflow at the time of conversion proxy connection in Form 2. is the same as in Form 1.

Figure 17:
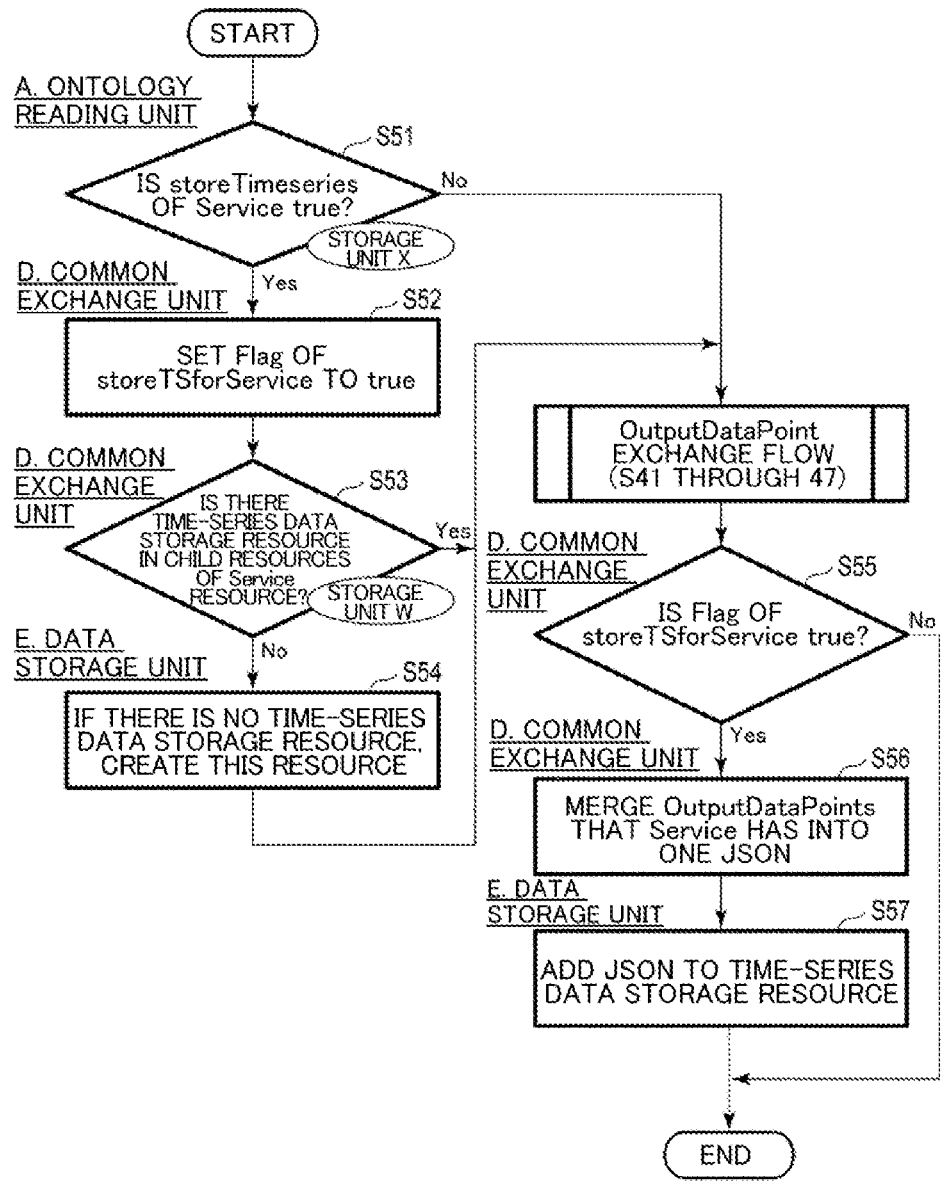
FIG. 17 is a diagram illustrating an example of a workflow of data exchange.
Figure 18:
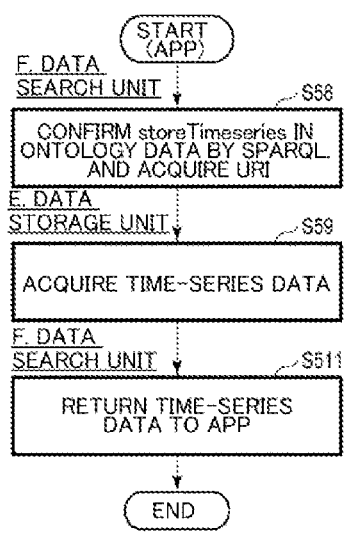
FIG. 18 is a diagram illustrating an example of a workflow of data exchange.
Figure 19:
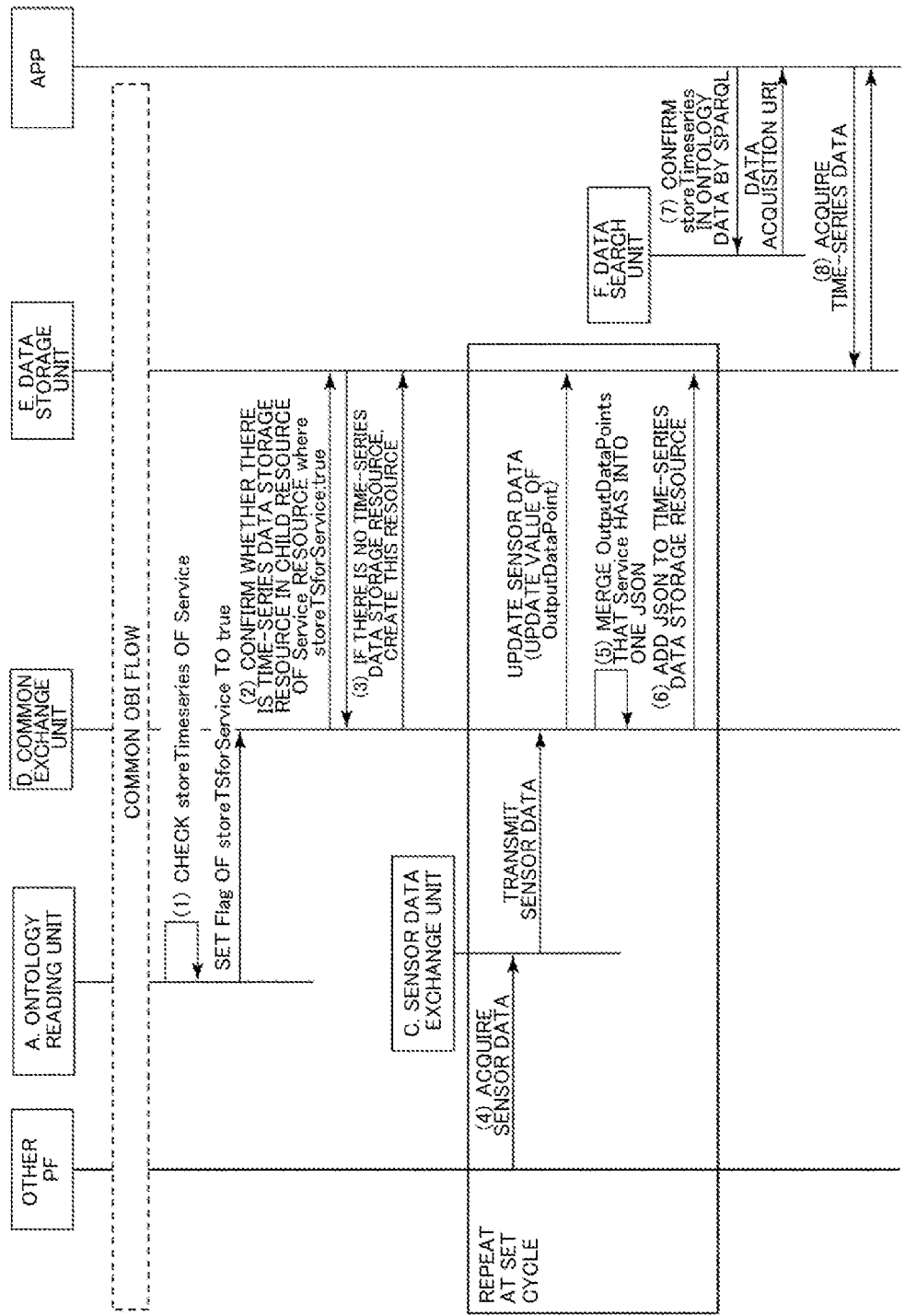
FIG. 19 is a diagram illustrating an example of a sequence of data exchange.

Next, the data exchange workflow in (Option.1) will be described. FIG. 17 and FIG. 18 are diagrams illustrating an example of the workflow of data exchange, and FIG. 19 is a diagram illustrating an example of a sequence of data exchange.

In the data exchange in (Option.1), a Boolean value of storeTimeseries under the Service resource described in the ontology is used to perform common history data management processing of OutputDataPoints under the Service resource.

First, the ontology reading unit 21 judges whether or not the storeTimeseries of Service is true (S51), and if true, the ontology reading unit 21 sets a Flag of storeTSforService in the storage unit X to true (S52).

Following S52, the common exchange unit 24 judges whether or not there is a time-series data storage resource in child resources of the Service resource in the storage unit W of the data storage unit 31 (S53). If there is no time-series data storage resource (No in S53), the common exchange unit 24 creates one in child resources of the Service resource in the storage unit W of the data storage unit 31 (S54).

At this time, the sensor data exchange unit 23 acquires sensor data from another PF, and transmits this sensor data to the common exchange unit 24. The common exchange unit 24 updates the sensor data at the data storage unit 31 in accordance with the sensor data that has been transmitted (updates the OutputDataPoint value).

The above OutputDataPoint exchange flow (S41 through S47) is performed when No in S51, when Yes in S53, or following S54.

Following the OutputDataPoint exchange flow, the common exchange unit 24 discerns whether or not the Flag of storeTSforService is true (S55). If the results of this discerning are not true (No in S55), the processing ends. If the results of this discerning are true (Yes in S55), the common exchange unit 24 merges the OutputDataPoints that the Service has into one JSON, and sends the results of this merging to the data storage unit 31 (S56).

The common exchange unit 24 adds the JSON that has been sent to the time-series data storage resource and sends to the data storage unit 31 (S57), and the processing ends. The processing from acquisition of sensor data up to S57 is repeated at a set cycle.

Also, after the app starts processing, the data search unit 32 confirms the storeTimeseries in the ontology data by SPARQL, acquires URI data, and sends this data to the app (S58).

The app requests the data storage unit 31 for acquisition of time-series data, the data storage unit 31 acquires time-series data from the storage unit X (S59), the data search unit 32 returns the time-series data to the app (S511), and the processing ends.

Figure 20:
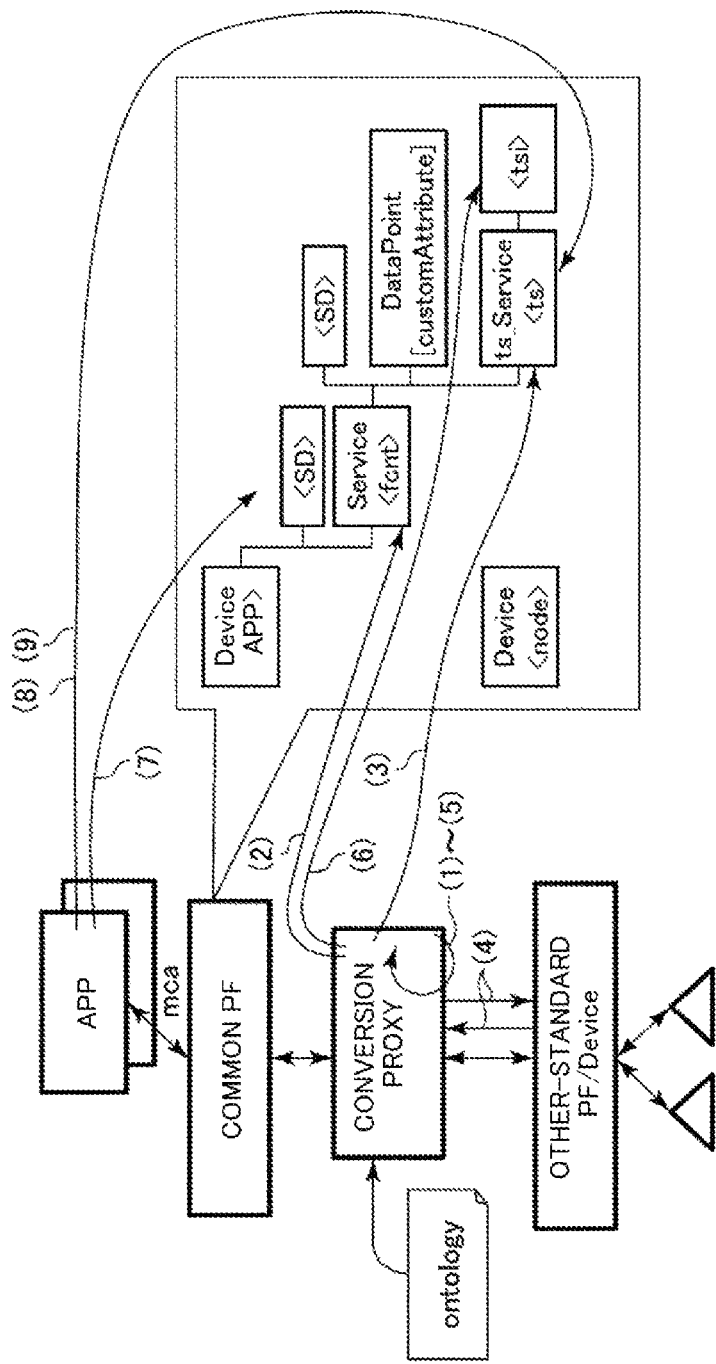
FIG. 20 is a diagram describing an example of procedures for accumulating time-series data.

Next, the procedures of (Option1.) for accumulating time-series data will be described. FIG. 20 is a diagram describing an example of procedures for accumulating time-series data.

In (Option1.) for accumulating time-series data, the processing of the following (1) through (9) is performed, as illustrated in FIG. 20.

(1) The Ontology is read in by the conversion proxy, and the storeTSforService in the conversion proxy is set to true for a Service in which storeTimeseries:true.

(2) In a case where the storeTSforService Flag is true, whether there is an object ts_Service<ts> in child resources of the object Service <fcnt> is checked.

(3) If there is no ts_Service<ts>, one is CREATEd.

(4) Data is obtained from the conversion proxy via the API of the other-standard PF/Device.

(5) OutputDataPoints in layer that is below Service resource are merged into one JSON.

(6) The conversion proxy CREATEs the JSON (ts_Service<ts>/<tsi>).

(7) The app confirms the state of the storeTimeseries of the desired Service by SPARQL.

(8) The app acquires the object <ts>.

(9) The app acquires <ts>/<latest> and so forth.

Figure 21:
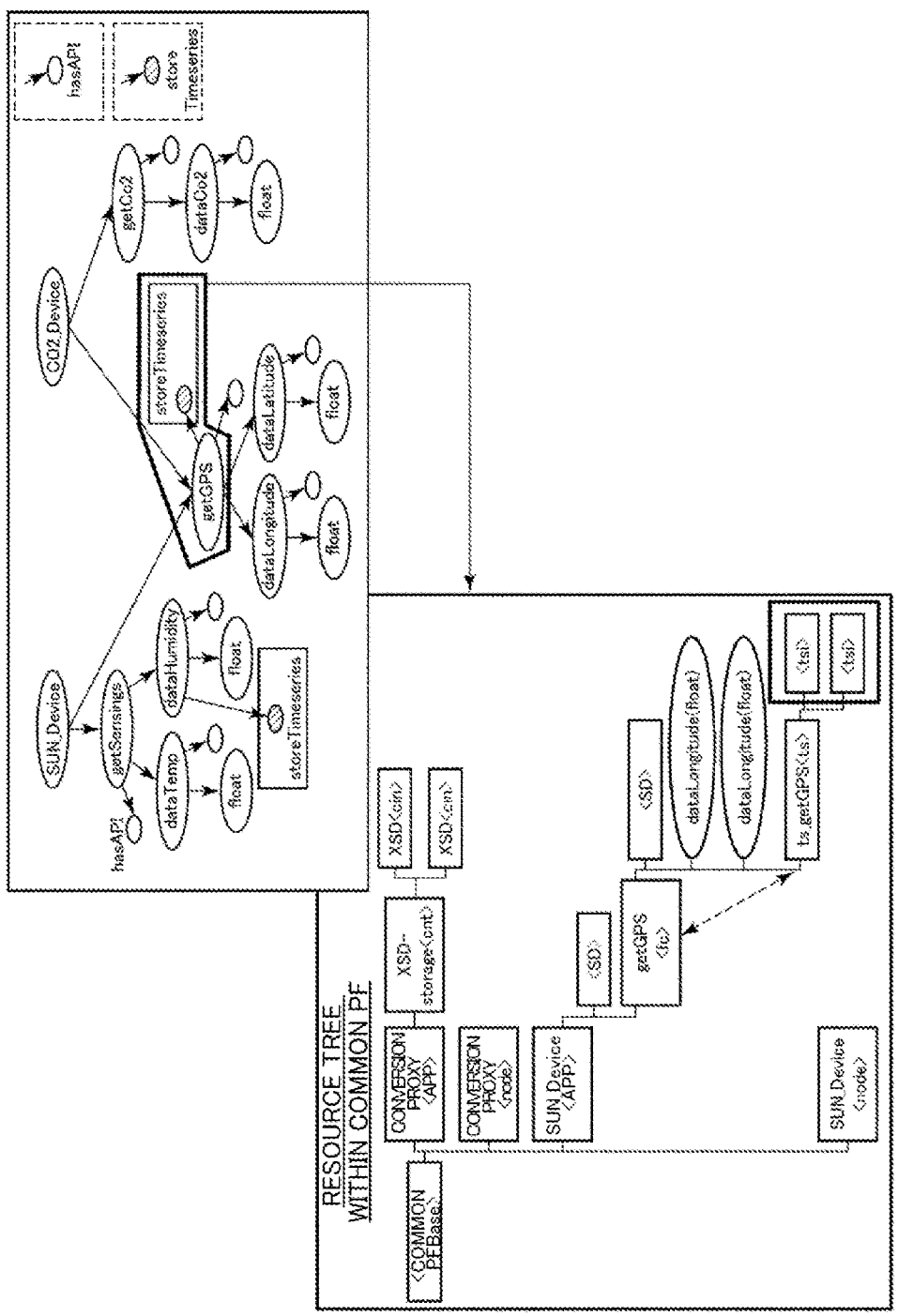
FIG. 21 is a diagram illustrating an Example of accumulation of time-series data.

Next, an Example of (Option1.) in Form 2. will be described. FIG. 21 is a diagram illustrating an Example of accumulation of time-series data.

In (Option1.), in a case where a plurality of DataPoints are accumulated together, ON/OFF of saving time-series data is set for each Service. Here, Ts (time-series data) is created at the layer below the object Service resource, and all OutputDataPoints under the Service are stored together in con of <tsi> in JSON. In the example illustrated in FIG. 21, the DataPoint values of the layer below the instance "getGPS" are stored together in two "<tsi>" which are under a "<common PFBase>", which is the highest in order in the resource tree within the common PF, with "SUN_Device<app>", "getGPS<fc>", and "ts_getGPS<ts>" therebetween ({dataLongitude:XXX, dataLatitude:YYY}).

Figure 22:
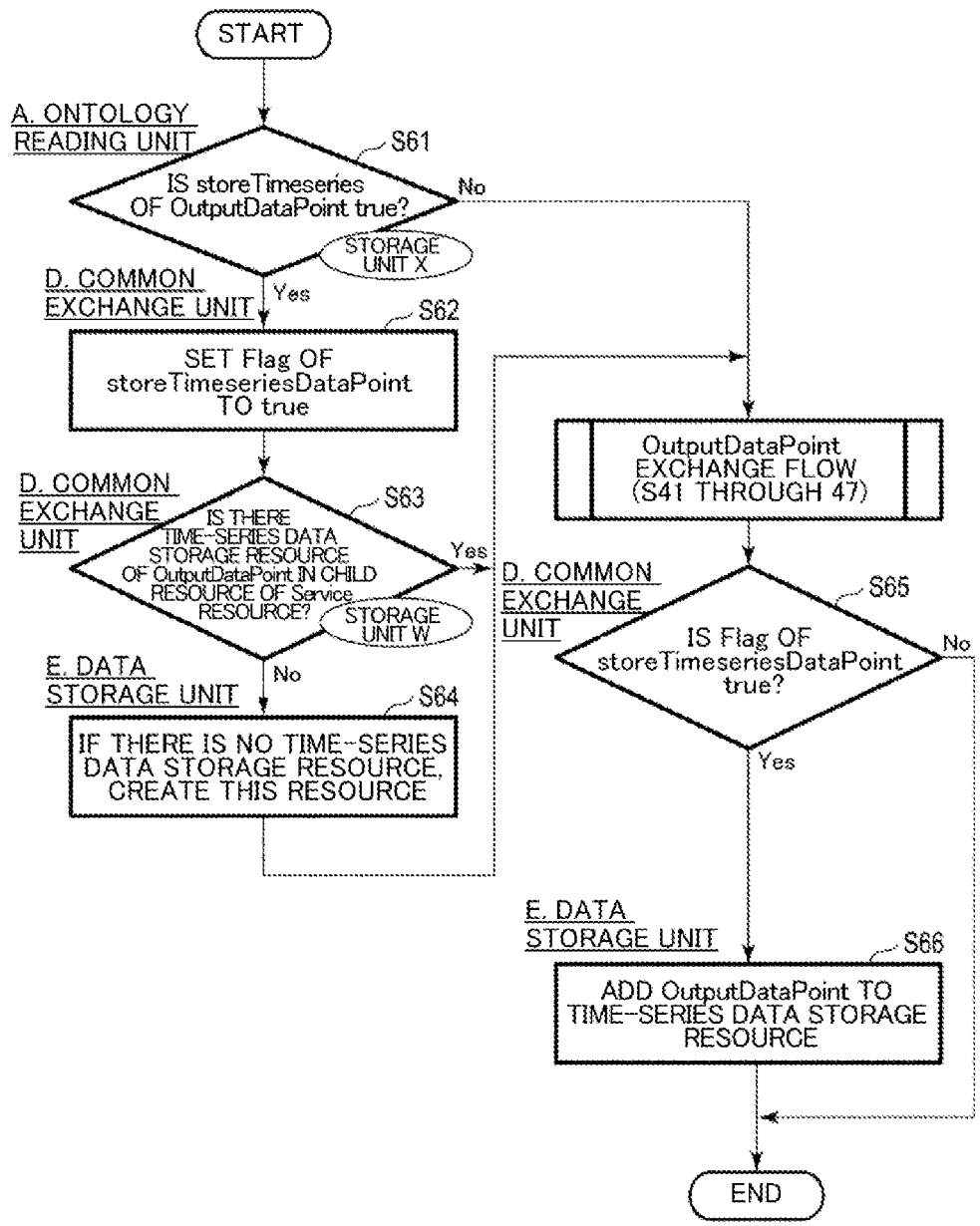
FIG. 22 is a diagram illustrating an example of a workflow of data exchange.
Figure 23:
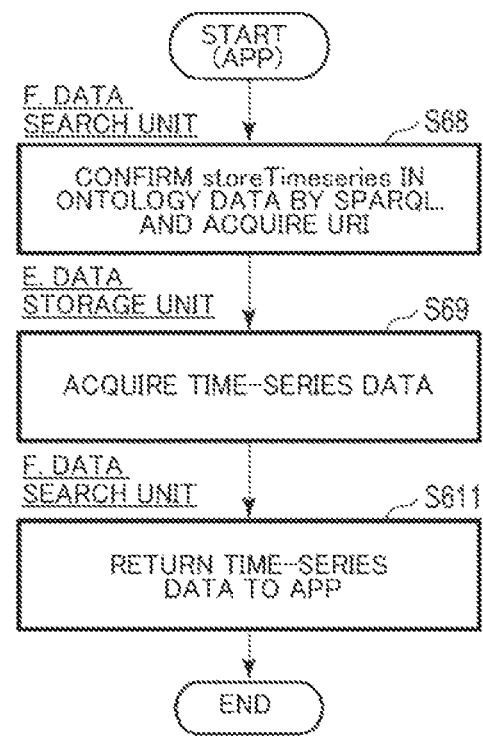
FIG. 23 is a diagram illustrating an example of a workflow of data exchange.
Figure 24:
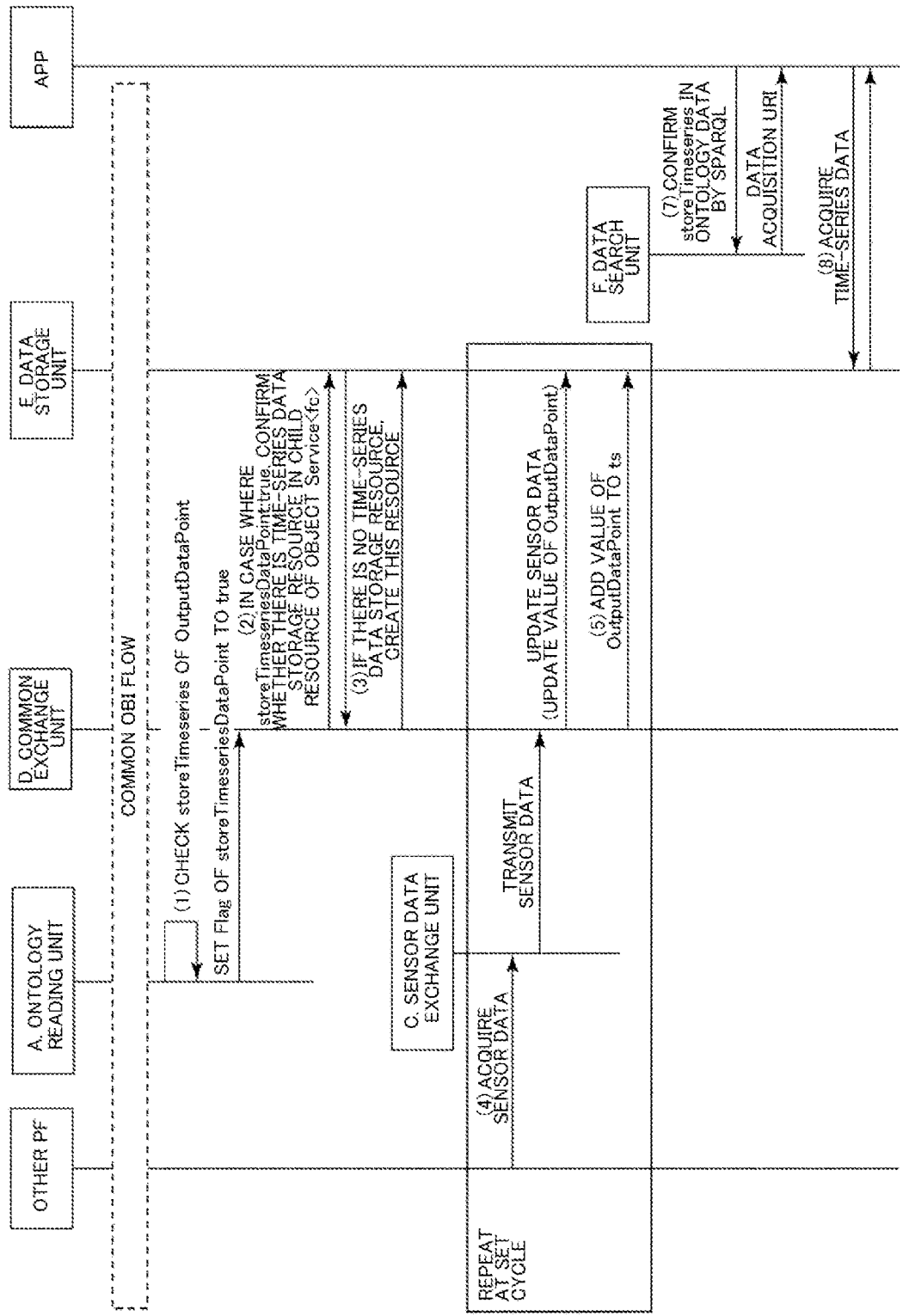
FIG. 24 is a diagram illustrating an example of a sequence of data exchange.

Next, the workflow of data exchange in (Option.2) will be described. FIG. 22 and FIG. 23 are diagrams illustrating an example of the workflow of data exchange, and FIG. 24 is a diagram illustrating an example of a sequence of data exchange.

In the data exchange in (Option.2), processing that is common to OutputDataPoints (acquiring data/commands from other-standard PFs or devices) is performed using an other-standard API described in the ontology.

First, the ontology reading unit 21 judges whether or not the storeTimeseries of the OutputDataPoint is true (S61), and if true (Yes in S61), the ontology reading unit 21 sets a Flag of a storeTimeseriesDataPoint in the storage unit X to true (S62).

Following S62, the common exchange unit 24 judges whether or not there is a time-series data storage resource of the OutputDataPoint in child resources of the Service resource (object Service<fc>) in the storage unit W (S63).

If there is no time-series data storage resource (No in S63), the common exchange unit 24 creates this time-series data storage resource in the child resources of the Service resource in the storage unit W of the data storage unit 31 (S64). At this time, the sensor data exchange unit 23 acquires sensor data from another PF, and transmits this sensor data to the common exchange unit 24. The common exchange unit 24 updates the sensor data at the data storage unit 31 in accordance with the sensor data that has been transmitted (updates the OutputDataPoint value).

The above OutputDataPoint exchange flow (S41 through S47) is performed when No in S61, when Yes in S63, or following S64.

Following the OutputDataPoint exchange flow, the common exchange unit 24 discerns whether or not the Flag of the storeTimeseriesDataPoint is true (S65). If the results of this discerning are not true (No in S65), the processing ends. If the results of this discerning are true (Yes in S65), the common exchange unit 24 adds the OutputDataPoint to the time-series data storage resource and sends this to the data storage unit 31, and the processing ends (S66). The processing from acquisition of sensor data up to S66 is repeated at a set cycle.

Also, after the app starts processing, the data search unit 32 confirms the storeTimeseries in the ontology data by SPARQL, acquires URI data, and sends this URI data to the app (S68).

The app requests the data storage unit 31 for acquisition of time-series data, the data storage unit 31 acquires time-series data from the storage unit X (S69), the data search unit 32 returns the time-series data to the app (S611), and the processing ends.

Figure 25:
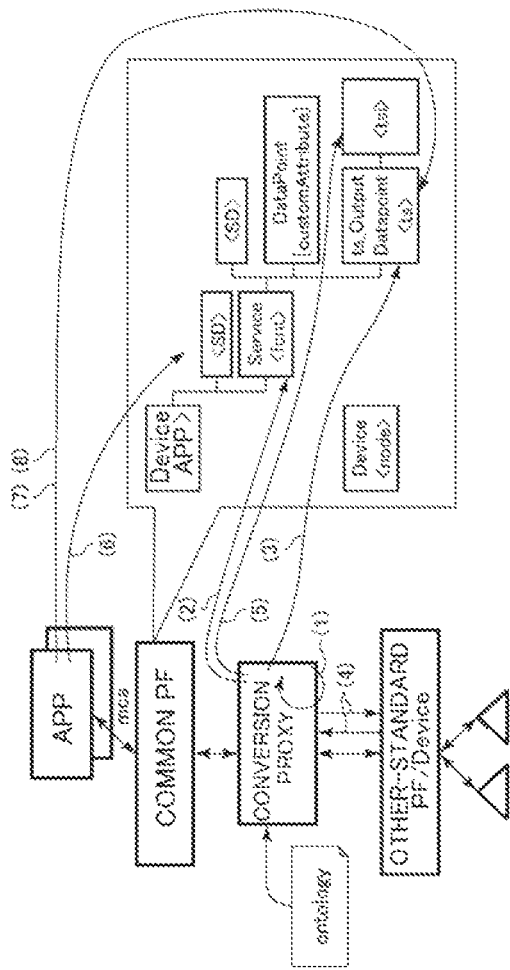
FIG. 25 is a diagram describing an example of procedures for accumulating time-series data.

Next, the procedures of (Option2.) for accumulating time-series data will be described. FIG. 25 is a diagram describing an example of procedures for accumulating time-series data.

In (Option2.) for accumulating time-series data, the processing of the following (1) through (8) is performed, as illustrated in FIG. 25.

(1) The Ontology is read in by the conversion proxy, and the storeTimeseries of an ObiServiceWrapper is set to true for an OutputDataPoint where storeTimeseries:true.

(2) In a case where the storeTimeseries Flag of the ObiServiceWrapper is true, the conversion proxy checks whether there is an object ts_OutputDataPoint<ts> in child resources of the object Service <fcnt>.

(3) If there is no ts_OutputDataPoint<ts>, one is CREATEd.

(4) Data is obtained from the conversion proxy via the API of the other-standard PF/Device.

(5) The conversion proxy CREATEs the DataPoint (ts_OutputDataPoint<ts>/<tsi>).

(6) The app confirms the state of the storeTimeseries of the desired Service by SPARQL.

(7) The app acquires the object <ts>.

(8) The app acquires <ts>/<latest> and so forth.

Figure 26:
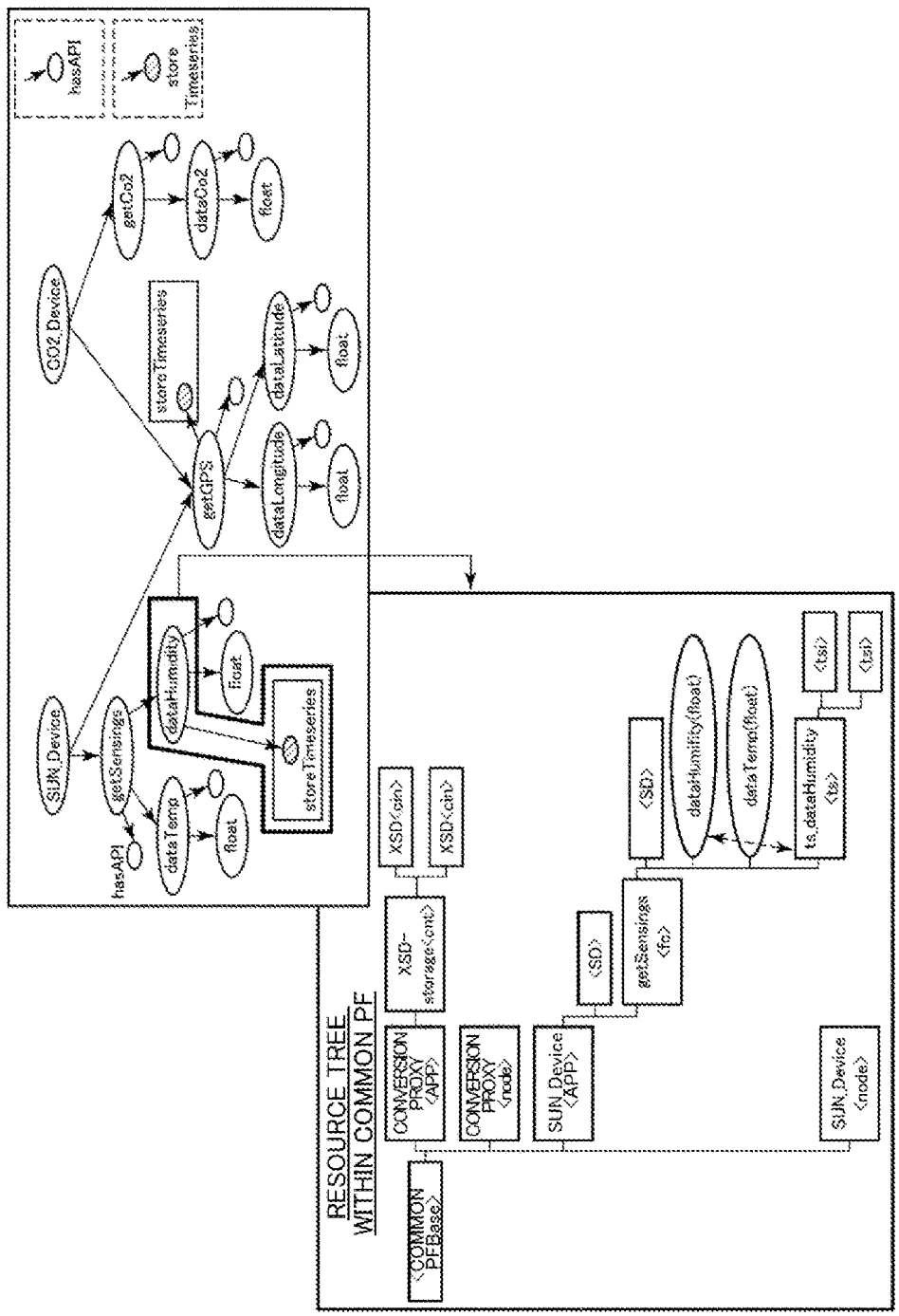
FIG. 26 is a diagram illustrating an Example of accumulation of time-series data.

Next, an Example of (Option2.) in Form 2. will be described. FIG. 26 is a diagram illustrating an Example of accumulation of time-series data.

In (Option2.), ON/OFF of saving time-series data is set for OutputDataPoint in a case where accumulation for each DataPoint is desired.

Here, Ts (time-series data) is created for each object OutputDataPoint, a dataHumidity value is stored in con of tsi. In the example illustrated in FIG. 26, the dataHumidity value of the layer below the instance "dataHumidity" is stored in two "<tsi>" which are under a "<common PFBase>", which is the highest in order in the resource tree within the common PF, with "SUN_Device<app>", "getSensings<fc>", "dataHumidity(float)" and "ts_dataHumidity<ts>" (same layer as "dataHumidity(float)") therebetween.

(Form 3.)

Figure 27:
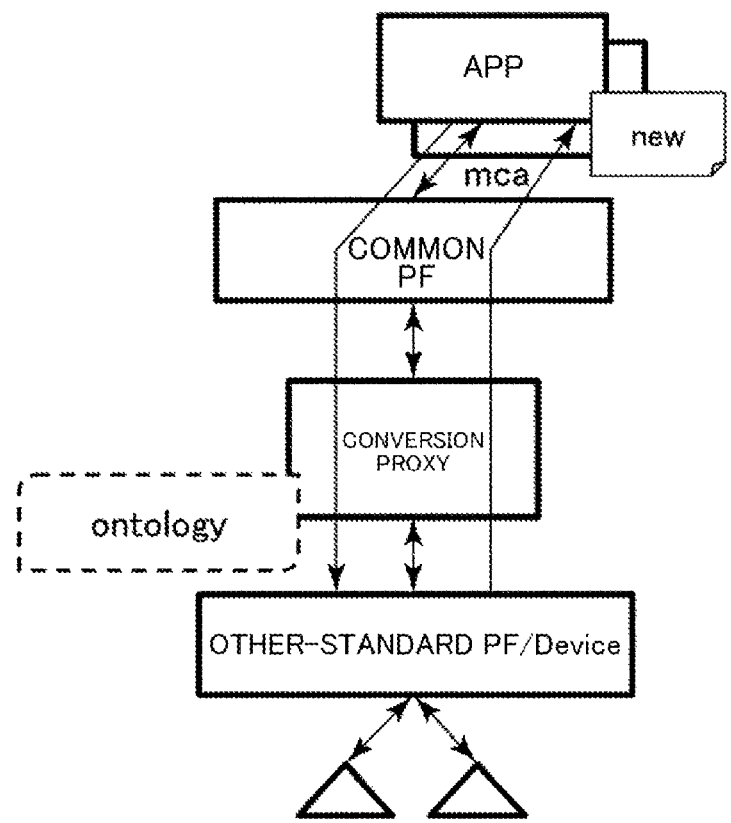
FIG. 27 is a diagram describing an example of acquisition on demand.

Next, details of "Form 3.: Acquiring on Demand" which is an extended form of the basic form will be described. FIG. 27 is a diagram describing an example of accumulating acquisition results on demand.

Issues of acquiring on demand will be described. To begin with, in OBI of oneM2M, acquired data constantly continues to be updated, but in cases where there is little demand for data usage with regard to devices where data is generated at a high frequency, it is conceivable that updating of data may go to waste.

Accordingly, the technology of Form 3. uses <Protocol: onDemand>, and function fields acquired from other-standard devices (or PFs) on demand by requests from apps are newly added, instead of saving the newest values of data in the common PF, thereby acquiring data in accordance with user demand.

Figure 28:
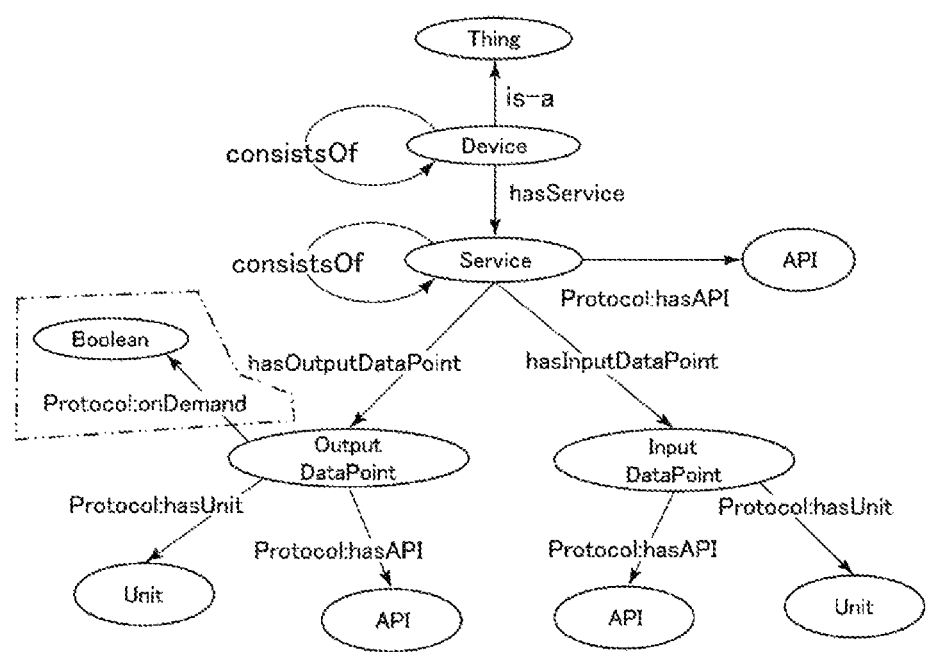
FIG. 28 is a diagram describing an example of an ontology extended field.

Next, the ontology extended field in Form.3 will be described. FIG. 28 is a diagram for describing an example of the ontology extended field.

As illustrated in FIG. 28, in Form.3, a metadata field "standard name:onDemand" that is defined to acquire newest data of a device, from the device, by a request from an application, is used to acquire data from an other-standard device (or PF) on demand, by a request from an app.

In Form 3., the metadata field "standard name:onDemand" is added to an OutputDataPoint, and in a case of being set to true, values are acquired on demand in response to requests from the app, instead of the common PF constantly continuing to acquire newest values from other-standard PFs/Devices.

The workflow at the time of conversion proxy connection in Form 3. is the same as in Form 1.

Figure 29:
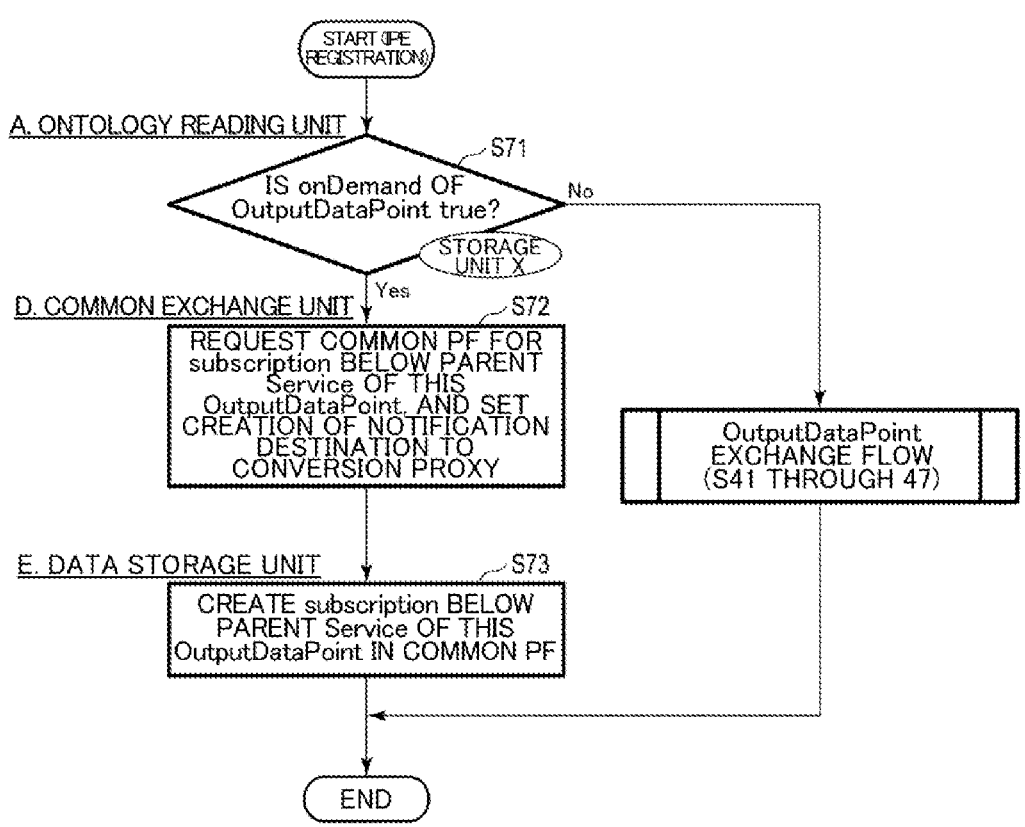
FIG. 29 is a diagram illustrating an example of a workflow of data exchange.
Figure 30:
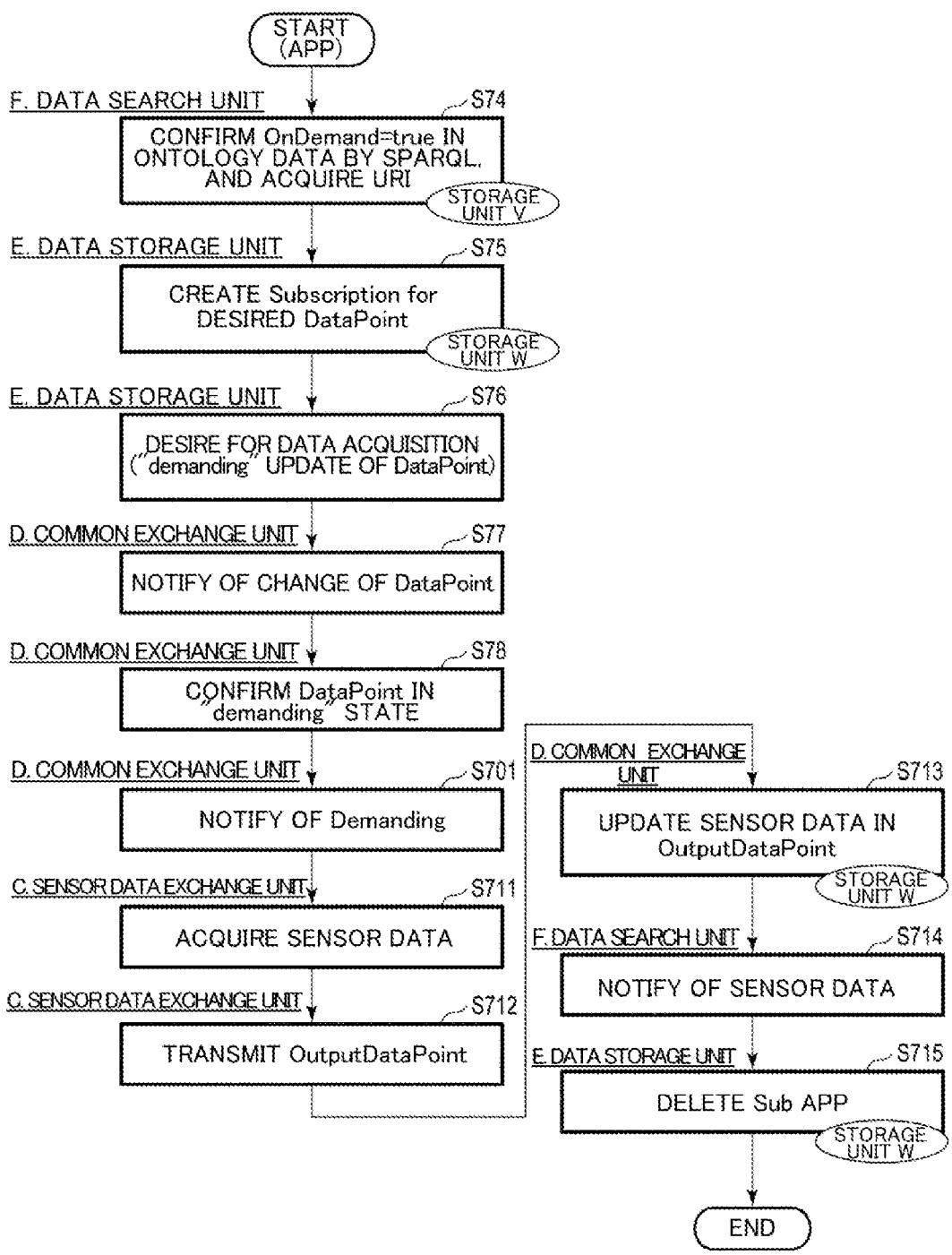
FIG. 30 is a diagram illustrating an example of a workflow of data exchange.
Figure 31:
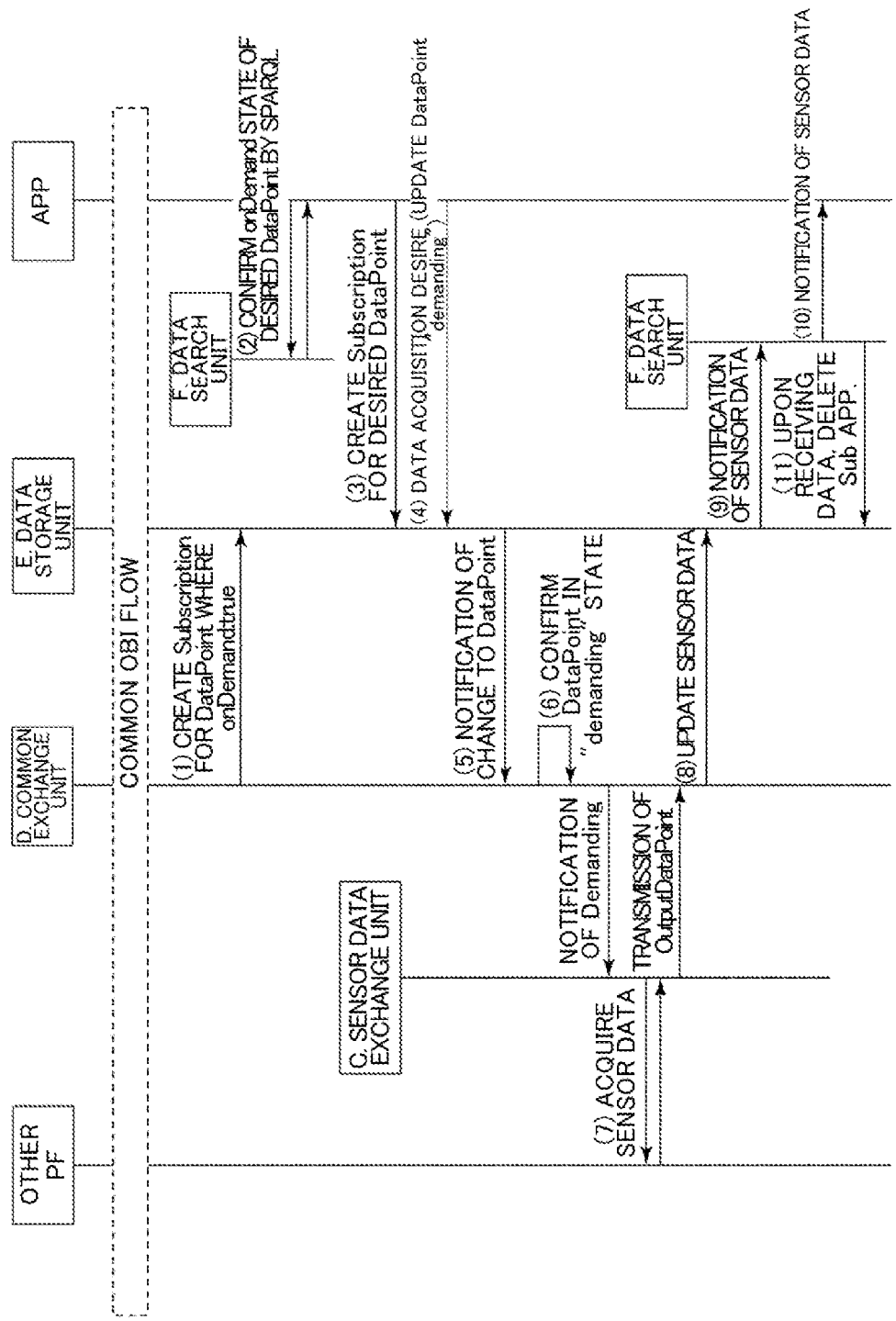
FIG. 31 is a diagram illustrating an example of a sequence of data exchange.

Next, the data exchange workflow in Form 3. will be described. FIG. 29 and FIG. 30 are diagrams illustrating an example of the workflow of data exchange, and FIG. 31 is a diagram illustrating an example of a sequence of data exchange.

In the data exchange in Form 3., a Boolean value of onDemand described in the ontology is used to perform on-demand acquisition processing common to the OutputDataPoints.

When processing is started by registration of an IPE that handles data mapping and exchange with a protocol of another standard, the ontology reading unit 21 judges whether or not onDemand of an OutputDataPoint in the storage unit X is true (S71). If the results of this judgment are true (Yes in S71), the common exchange unit 24 makes a request for creation of a subscription in the common PF at a layer below a parent Service of this OutputDataPoint, and sets the notification destination to the conversion proxy (S72).

The common exchange unit 24 creates a subscription in the common PF at the layer below the parent Service of this OutputDataPoint and sends to the data storage unit 31, and the processing ends (S73).

If not true in S71 (No in S71), the OutputDataPoint exchange flow (S41 through S47) is performed, and the processing ends.

Also, after the app starts processing, the data search unit 32 confirms onDemand=true in the ontology data in the storage unit V by SPARQL, acquires URI data, and sends this URI data to the app (S74).

The app creates a Subscription for the desired DataPoint, and stores this Subscription in the storage unit W of the data storage unit 31 (S75).

The app transmits a data acquisition desire ("demanding" update of DataPoint) to the data storage unit 31 (S76).

The data storage unit 31 notifies the common exchange unit 24 of change of the DataPoint (S77).

The common exchange unit 24 confirms the DataPoint in a "demanding" state (S78).

The common exchange unit 24 performs a Demanding notification to the sensor data exchange unit 23 (S79).

The sensor data exchange unit 23 acquires sensor data from another PF (S711), and transmits the OutputDataPoint to the common exchange unit 24 (S712).

The common exchange unit 24 performs updating, reflecting the sensor data in the OutputDataPoint in the storage unit W of the data storage unit 31 (S713).

The data storage unit 31 notifies the app of the sensor data via the data search unit 32 (S714).

Upon receiving the sensor data, the data search unit 32 deletes a Sub app in the storage unit W of the data storage unit 31 (S715).

Figure 32:
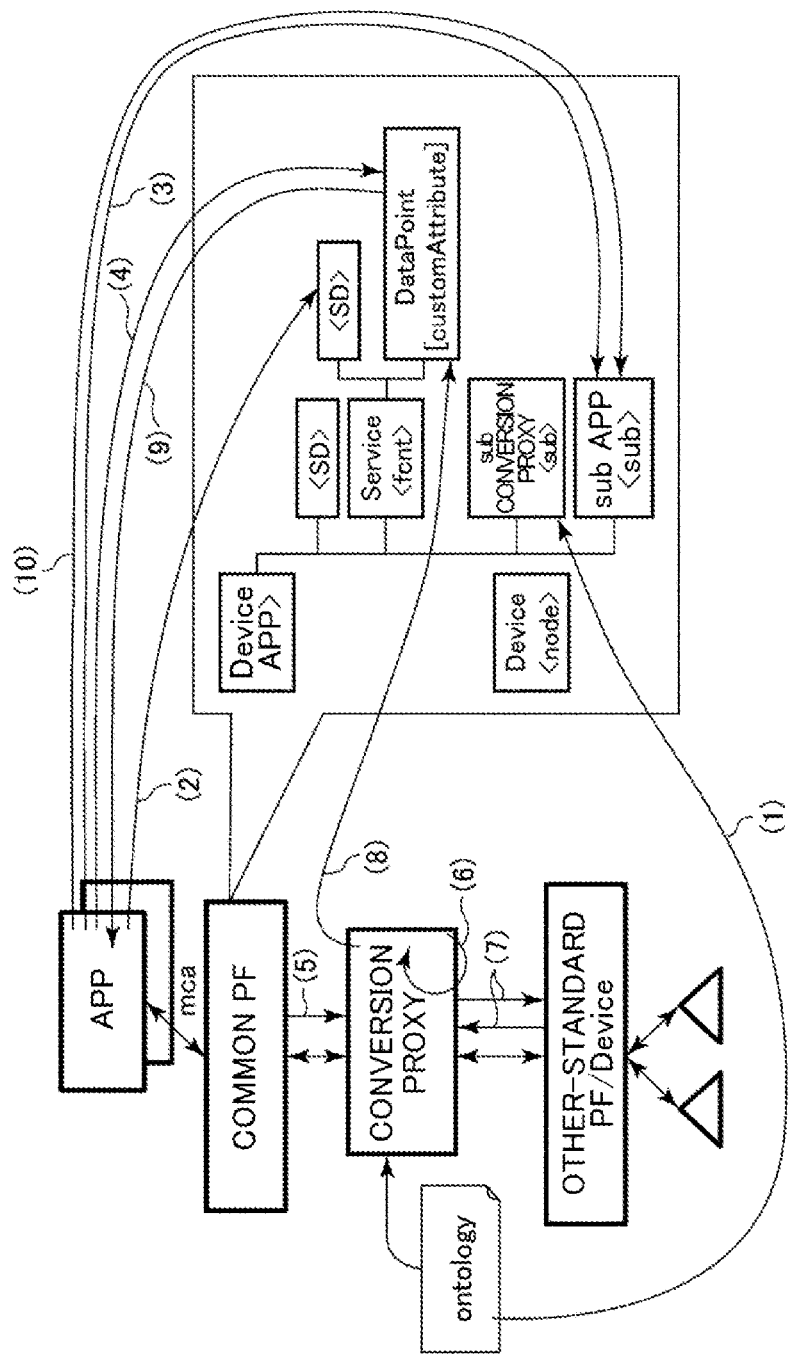
FIG. 32 is a diagram illustrating an example of procedures for acquisition on demand.

Next, procedures of acquisition on demand will be described. FIG. 32 is a diagram illustrating an example of procedures for acquisition on demand.

In acquisition on demand, processing of the following (1) through (10) is performed, as illustrated in FIG. 32.

(1) The conversion proxy reads the Ontology, and creates a sub conversion proxy <sub> at a layer below the object Service <fcnt> within the common PF for a DataPoint where onDemand:true. Even in a case where a Service has a plurality of DataPoints, one subscription has notifications distributed in increments of DataPoints when receiving a notify later.

(2) The app confirms the onDemand state of a desired DataPoint by SPARQL.

(3) In a case where onDemand is True, a sub app <sub> is created on the layer below the object Service <fcnt>.

(4) The desired DataPoint is UPDATEd ([DataPoint]: "demanding").

(5) The conversion proxy is Notified by the common PF by the above (sub conversion proxy).

(6) The content of the Notification is confirmed within the conversion proxy.

(7) Data is obtained from the conversion proxy via the API of an other-standard PF/Device.

(8) The conversion proxy UPDATEs the DataPoint ([DataPoint]:{value}).

(9) The app is Notified by the common PF by the above (sub app).

(10) Upon receiving the data, the app deletes the sub app.

Figure 33:
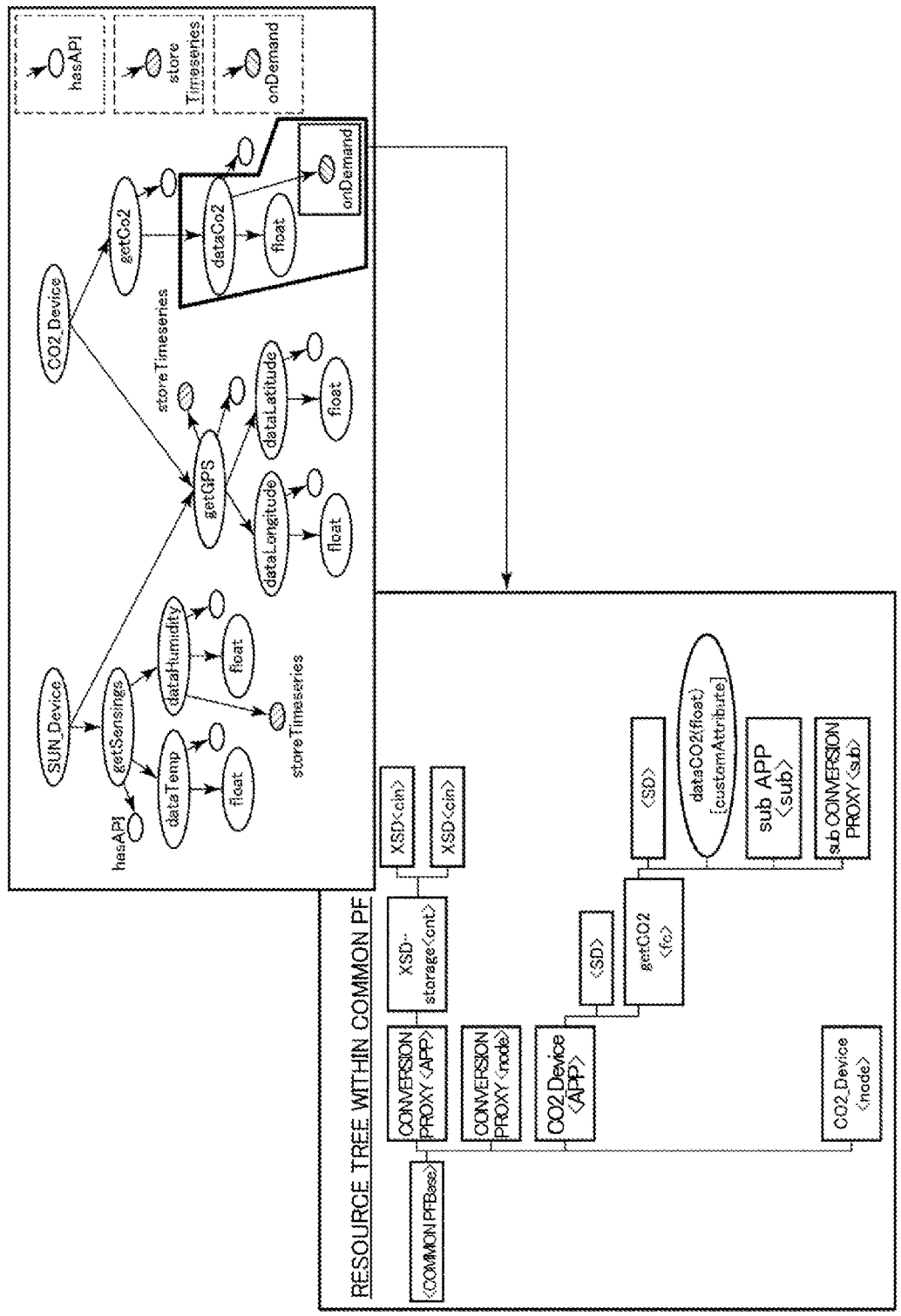
FIG. 33 is a diagram illustrating an Example of acquisition on demand.

Next, an Example of Form 3. will be described. FIG. 33 is a diagram illustrating an Example of acquisition on demand.

In Form 3., whether or not data is acquired on demand is set for each OutputDataPoint. In the example illustrated in FIG. 33, a dataCO2 value is acquired on demand, temporarily stored in the resource tree within the common PF, and sent to the app. In the example illustrated in FIG. 33, the value of a layer below the instance "dataCO2" is stored in "dataCO2(float)[customAttribute]" in a layer below "getCO2<fc>", which is under "<common PFBase>", which is the highest in order in the resource tree within the common PF, with "CO2_Device<app>" therebetween.

(Form 4.)

Figure 34:
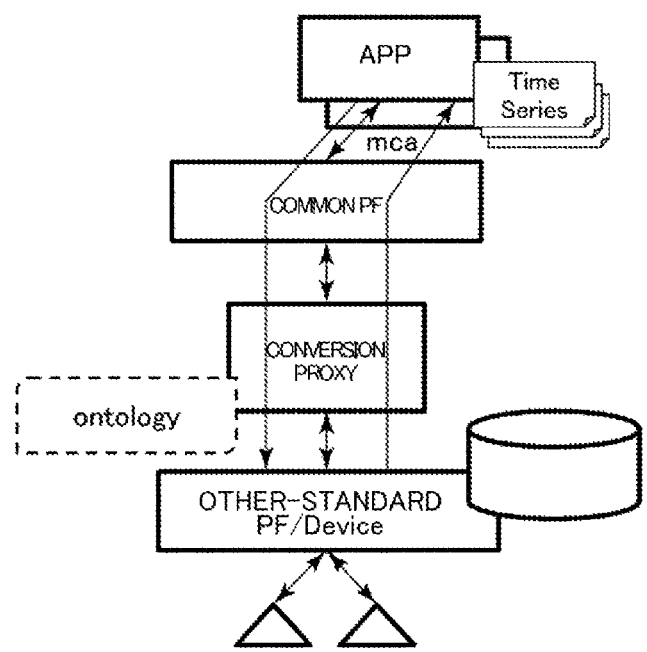
FIG. 34 is a diagram illustrating an example of batch acquisition on demand.

Next, details of "Form 4.: Span (span) Specified Batch Acquisition on Demand" which is an extended form of the basic form will be described. FIG. 34 is a diagram describing an example of accumulation of results of batch acquisition on demand.

Issues of batch acquisition on demand will be described.

To begin with, in OBI of oneM2M, only the newest values of acquired data are held. Accordingly, even if past data is accumulated in another PF, this data could not be acquired by a request from an app.

Accordingly, the technology of Form 4. uses <Protocol: onDemandTS>, and a function field is newly added in which data is acquired from other-standard devices (or PFs) in a batch, on demand by a request from an app for a specified period. In this technology, data for a certain period in the past that is accumulated in another PF is acquired in a batch in accordance with user demand.

Figure 35:
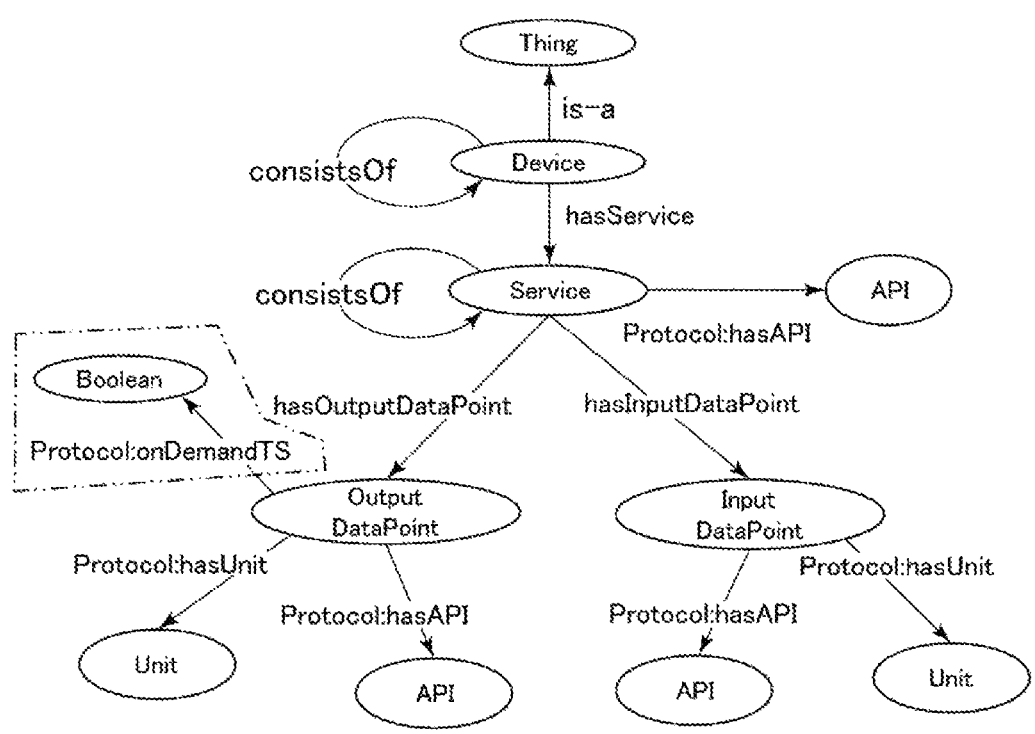
FIG. 35 is a diagram describing an example of an ontology extended field.

Next, the ontology extended field in Form 4. will be described. FIG. 35 is a diagram for describing an example of the ontology extended field.

As illustrated in FIG. 35, in Form 4., a metadata field "standard name:onDemandTS" that is defined to acquire time-series data stored in an other-standard PF/Device that is unique to the device, in a batch by a request from an application, is used. History data stored in this other-standard PF/Device is acquired in a batch from the other-standard device (or PF) on demand, by a request from the app.

In Form 4., the metadata field "standard name:onDemandTS" is added to an OutputDataPoint, and in a case of this onDemandTS being set to true, data is acquired on demand in response to requests from the app, instead of the common PF constantly continuing to acquire newest values from other-standard PFs/Devices. At the time of acquiring data, history data over a time span specified by the app is acquired in a batch, and is saved in the common PF.

The workflow at the time of conversion proxy connection in Form 4. is the same as in Form 1.

Figure 36:
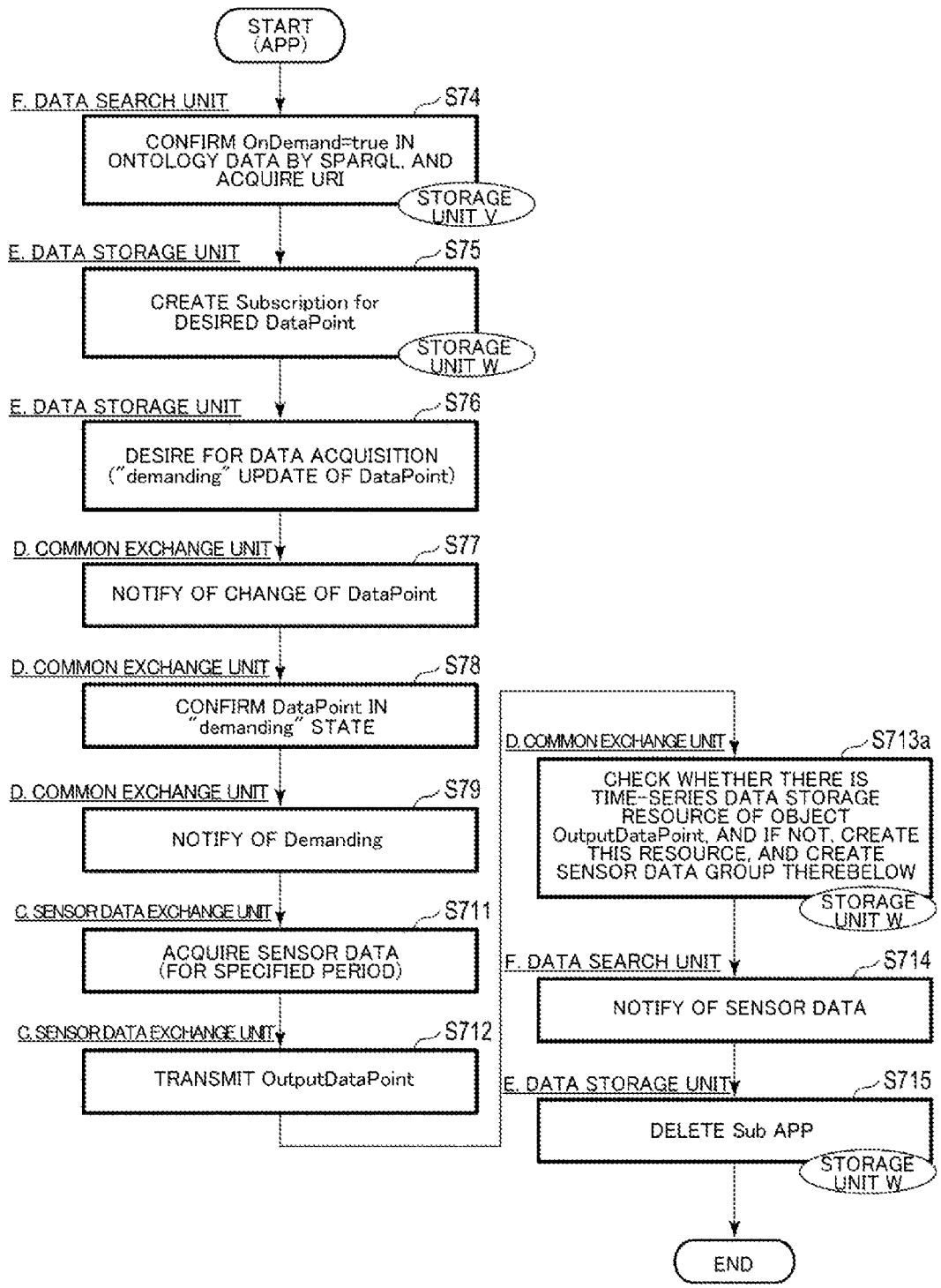
FIG. 36 is a diagram illustrating an example of a workflow of data exchange.
Figure 37:
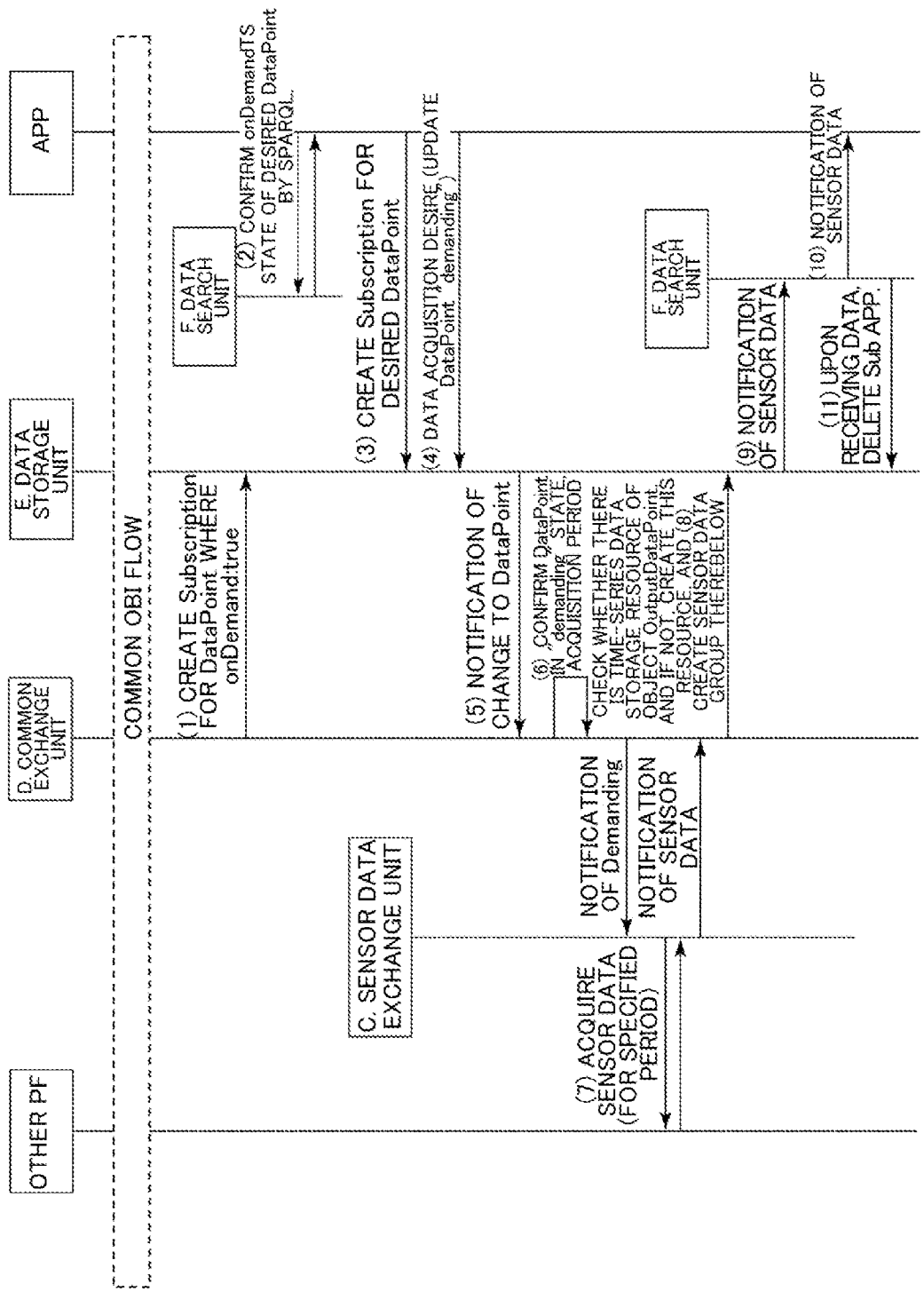
FIG. 37 is a diagram illustrating an example of a sequence of data exchange.

Next, the data exchange workflow in Form 4. will be described. FIG. 36 is a diagram illustrating an example of the workflow of data exchange, and FIG. 37 is a diagram illustrating an example of a sequence of data exchange.

In the data exchange in Form 4., a Boolean value of onDemandTS described in the ontology is used to specify an on-demand span common to the OutputDataPoints, and the processing of batch acquisition is performed.

When processing is started by registration of an IPE, S71 through S74 described in FIG. 29, and the OutputDataPoint exchange flow (S41 through S47), are performed.

Also, after the app starts processing, the processing of S74 through S79 shown in FIG. 30 is performed, and the sensor data exchange unit 23 acquires sensor data for the specified period from another PF (S711) and transmits the Output-DataPoint (sensor data) to the common exchange unit 24 (S712).

The common exchange unit 24 checks whether or not there is a time-series data storage resource of the object OutputDataPoint, and if not, creates this resource, and creates a sensor data group at a layer below this resource (S713a). Thereafter, S714 and S715 described in FIG. 30 are performed and the processing ends.

Next, procedures for span-specified on-demand batch acquisition will be described.

In span-specified on-demand batch acquisition upon (1) through (5) shown in FIG. 32 being performed, (6) and thereafter below are performed.

(6) The content of the Notification is confirmed within the conversion proxy, and the acquisition period for the data is confirmed.

(7) Data is obtained from the conversion proxy via the API of an other-standard PF/Device.

(8) Whether or not there is an object OutputDataPoint<ts> is checked, and if not, this object OutputDataPoint<ts> is CREATEd, and data update is CREATEd in a layer therebelow (Device/Service/<ts>/<tsi>).

(9) The app is Notified by the common PF by the above (sub app).

(10) Upon receiving the data, the app deletes the sub app.

Figure 38:
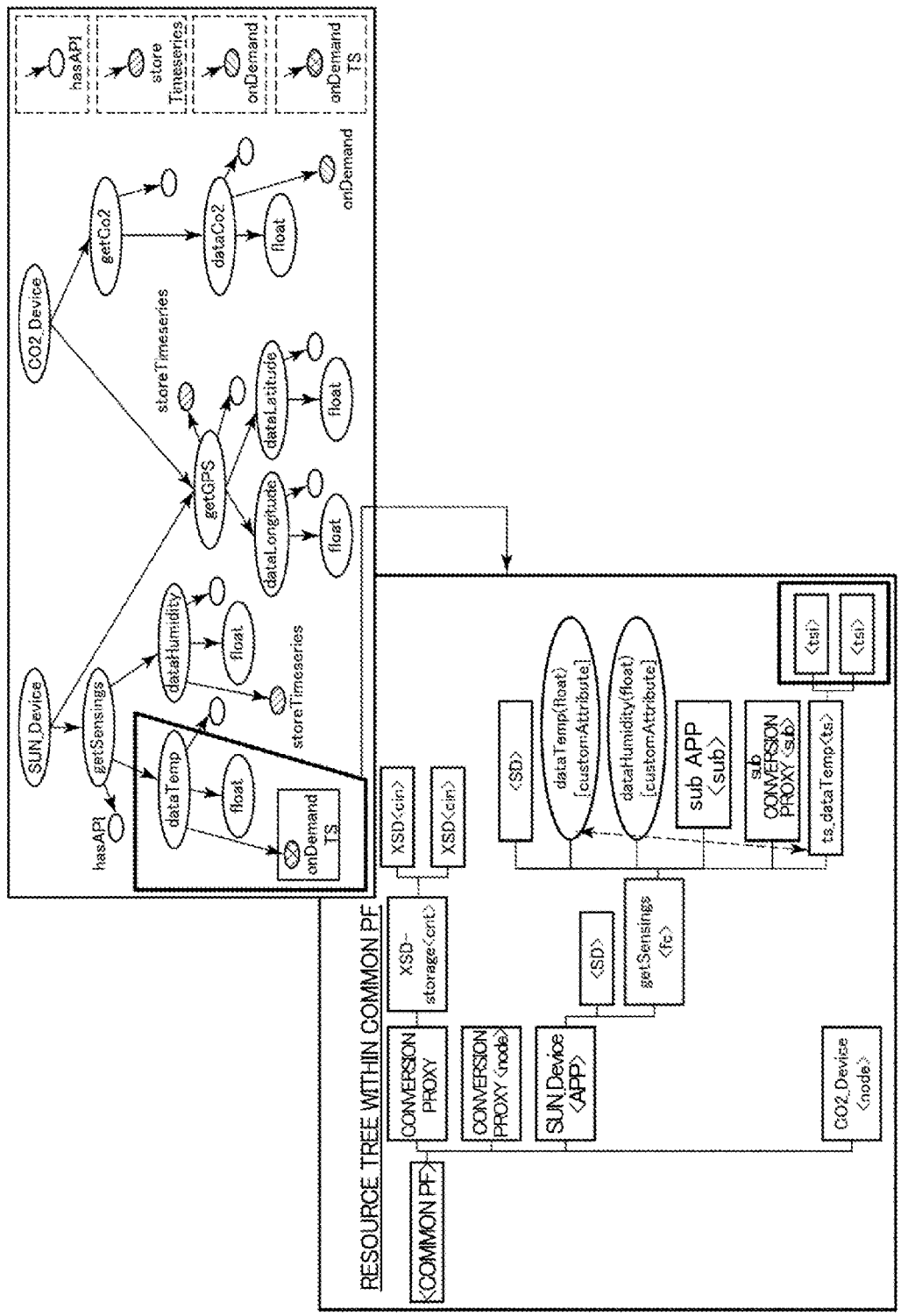
FIG. 38 is a diagram illustrating an Example of batch acquisition on demand.

Next, an Example of Form 4. will be described. FIG. 38 is a diagram illustrating an Example of batch acquisition on demand.

In Form 4., whether or not to perform batch acquisition of data on demand, and the period of acquisition of data, are set for each OutputDataPoint. In the example illustrated in FIG. 38, the value of the layer that is below the instance "dataTemp" is accumulated in two "<tsi>" which are under a "<common PFBase>", which is the highest in order in the resource tree within the common PF, with "SUN_Device<app>", "getSensings<fc>", and "ts_dataTemp<ts>" therebetween, as past data that has been acquired.

Figure 39:
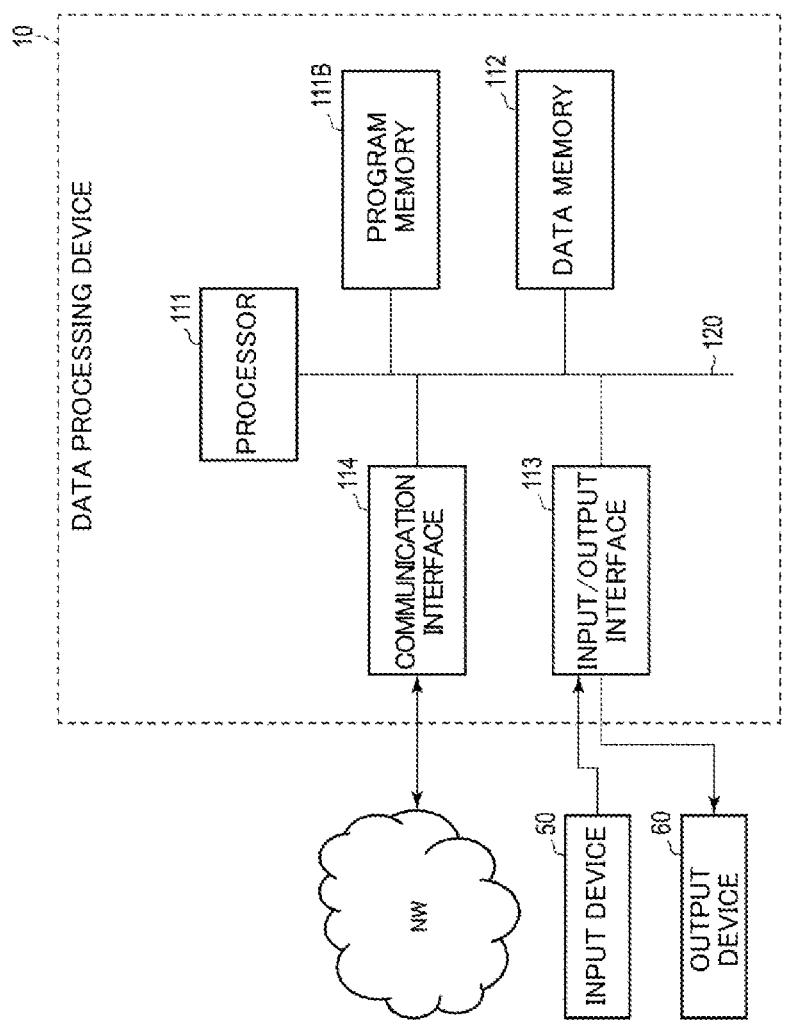
FIG. 39 is a block diagram illustrating an example of a hardware configuration of an information processing system according to an embodiment of the present invention.

FIG. 39 is a block diagram illustrating an example of a hardware configuration of the information processing system according to an embodiment of the present invention.

In the example illustrated in FIG. 39, the data processing device 10 in the information processing system according to the above embodiment is configured of a server computer or a personal computer for example, and has a hardware processor 111A such as a CPU or the like. Program memory 111B, data memory 112, an input/output interface 113, and a communication interface 114 are connected to this hardware processor 111A via a bus 120. This is the same for the common PF server 30 illustrated in FIG. 3 as well.

The communication interface 114 includes one or more wireless communication interface units, for example, and enables exchange of information with a communication network NW. For the wireless interface, an interface that employs a low-power wireless data communication standard such as wireless LAN (Local Area Network) or the like, for example, is used.

An input device 50 and an output device 60 for an operator, provided to the data processing device 10, are connected to the input/output interface 113.

The input/output interface 113 performs processing of taking in operation data input by the operator through the input device 50, such as a keyboard, touch panel, touchpad, mouse, or the like, and outputting output data for display on the output device 60 including a display device using liquid crystal, organic EL (Electro Luminescence), or the like. Note that for the input device 50 and the output device 60, devices built into the data processing device 10 may be used, or alternatively, an input device and an output device of another information terminal that is capable of communicating with the data processing device 10 via the communication network NW may be used.

The program memory 111B is an arrangement using a combination of non-volatile memory capable of writing and reading as necessary, such as an HDD (Hard Disk Drive), SSD (Solid State Drive), or the like, and non-volatile memory such as ROM (Read Only Memory) and so forth, for example, as a non-transitory tangible storage medium, storing programs necessary for executing each type of control processing according to an embodiment.

The data memory 112 is an arrangement using a combination of the above non-volatile memory and volatile memory such as RAM (Random Access Memory) and so forth, for example, as a tangible storage medium, and is used to store various types of data acquired and created in the process of each type of processing being performed.

The data processing device 10 according to an embodiment of the present invention may be configured as a data processing device having, as function units for processing by software, the ontology creating unit, the ontology reading unit 21, the device management unit 22, the sensor data exchange unit 23, and the common exchange unit 24, illustrated in FIG. 3 and so forth. This is the same for the common PF server 30 having the data storage unit 31 and the data search unit 32, illustrated in FIG. 3, as well.

The ontology data storage unit 21a, the device information storage unit 22a, and the sensor data storage unit 23a of the data processing device 10 may be configured using the data memory 112 illustrated in FIG. 39. This is the same for the ontology data storage unit 31a and data tree storage unit 31b of the common PF server 30 as well. Note, however, that these storage units are not configurations that are indispensable to be inside the data processing device 10, and may be provided in an externally-attached storage medium such as USB (Universal Serial Bus) memory or the like, or a storage device such as a database server or the like situated in a cloud, for example.

The processing function units at the units of the ontology creating unit, the ontology reading unit 21, the device management unit 22, the sensor data exchange unit 23, and the common exchange unit 24, described above, may each be realized by the hardware processor 111A reading out and executing programs stored in the program memory 111B. This is the same for the data storage unit 31 and the data search unit 32 illustrated in FIG. 3 as well. Note that part or all of these processing function units may be realized by various other forms, including integrated circuits, such as an application-specific integrated circuit (ASIC (Application Specific Integrated Circuit)), an FPGA (Field-Programmable Gate Array), or the like.

As described above, in the information processing system according to an embodiment of the present invention, the following resources are created on the basis of ontology data and device information, and data exchange is performed with a common platform server. The term ontology data here means data described in an ontology having a data structure corresponding to a unique standard. Also, the term the following resources means resources in which a data structure common to standards and a data exchange interface corresponding to unique standards are correlated. Accordingly, data exchange can be performed with portions, which needed to be coded for each standard, having been commonalized.

In order to achieve the above object, a first aspect of the information processing system according to an embodiment of this invention is an information processing system including a conversion proxy. This conversion proxy here is connected to devices corresponding to a plurality of types of unique standards, and further is connected to a common platform server that performs data exchange with applications. The conversion proxy includes an acquisition unit, a device management unit, and a common exchange unit. The acquisition unit here acquires ontology data described in an ontology with a data structure corresponding to the unique standards. Also, the device management unit acquires and manages unique device information correlated with devices corresponding to the plurality of types of unique standards. Also, the common exchange unit creates a resource such as follows on the basis of the ontology data acquired by the acquisition unit and the device information managed by the device management unit, and performs data exchange with the common platform server using the created resource. Now, this resource such as follows is a resource in which a data structure common to the plurality of types of unique standards and a data exchange interface corresponding to the unique standards are correlated.

In a second aspect of the information processing system according to this invention, in the first aspect, the common platform server has a data storage unit, the resource has a first data field, and the common exchange means of the conversion proxy stores the newest data acquired from the devices in the data storage unit, on the basis of definition regarding the first data field. The data storage unit here stores data acquired from the devices. Also, the first data field defines storing newest data acquired from the devices in the data storage unit.

In a third aspect of the information processing system according to this invention, in the first aspect, the common platform server has a data storage unit, the resource has a second data field, and the common exchange means of the conversion proxy stores the time-series data acquired from the devices in the data storage unit, on the basis of definition regarding the second data field. The data storage unit here stores data acquired from the devices. Also, the second data field defines storing time-series data acquired from the devices in the data storage unit.

In a fourth aspect of the information processing system according to this invention, in the first aspect, the resource has a third data field, and the common exchange means of the conversion proxy transmits data acquired from the devices to the application via the common platform server, on the basis of the definition regarding the third data field, in response to the request from the application. The third data field here defines acquiring, from the devices, newest data acquired from the devices, in response to a request from the application.

In a fifth aspect of the information processing system according to this invention, in the first aspect, the resource has a fourth data field, and the common exchange means of the conversion proxy transmits data acquired from the storage unit to the application via the common platform server, on the basis of the definition regarding the fourth data field, in response to the request from the application. The fourth data field here defines batch acquisition of time-series data stored in a unique storage unit correlated with the devices, in response to a request from the application.

An aspect of an information processing program according to an embodiment of the invention causes a processor to function as the means of the information processing system according to any one of the first through fifth aspects.

According to the first aspect of the information processing system according to an embodiment of this invention, a resource is created in which a data structure common to the standards and a data exchange interface corresponding to the unique standards are correlated, on the basis of the ontology data where a data structure corresponding to a unique standard is described by an ontology, and the device information. Data exchange is then performed with the common platform server on the basis of this resource. Thus, data exchange can be performed with portions that needed to be coded for each standard having been commonalized.

According to the second aspect of the information processing system according to an embodiment of this invention, the resource has a data field that defines storing newest data acquired from the devices in the common platform. Newest data acquired from the devices is stored in the data storage unit of the common platform in accordance with the definition of this data field. Thus, newest data can be obtained from the devices, with portions that needed to be coded for each standard having been commonalized.

According to the third aspect of the information processing system according to an embodiment of this invention, the resource has a data field that defines storing time-series data from the devices in the common platform. Time-series data acquired from the devices is then stored in the data storage unit of the common platform in accordance with the definition of this data field. Thus, time-series data can be obtained from the devices, with portions that needed to be coded for each standard having been commonalized.

According to the fourth aspect of the information processing system according to an embodiment of this invention, the resource has a data field. This data field here defines acquiring, from the devices, newest data acquired from the devices, in response to a request from the application. Data acquired from the devices is then sent to the application in accordance with the definition of this data field. Thus, newest data can be handed from the devices to the application, with portions that needed to be coded for each standard having been commonalized.

According to the fifth aspect of the information processing system according to an embodiment of this invention, the resource has a data field that defines batch acquisition of time-series data stored in a storage unit unique to the devices, in response to a request from the application. Data acquired from the storage unit is then sent to the application via the common platform server in accordance with the standard of this data field, in response to a request from the application. Thus, device-side time-series data can be handed to the application, with portions that needed to be coded for each standard having been commonalized.

Also, the techniques described in the embodiments can be distributed by being stored, as a computer executable program (software means) in a recording medium such as, for example, a magnetic disk (floppy (registered trademark) disk, hard disk, etc.), optical disk (CD-ROM, DVD, MO, etc.), semiconductor memory (ROM, RAM, flash memory, etc.), and so forth, or by being transmitted over a communication medium. Note that the program stored in the medium side also includes a settings program that configures software means (not limited to execution programs but also including tables and data structures) in the computer, to be executed by the computer. The computer that realizes this device reads in the program recorded in the recording medium, or in some cases constructs software means by a settings program, and executes the above-described processing by operations being controlled by the software means. Note that the recording medium in the present specification is not limited to media for distribution, and includes storage media such as magnetic disks, semiconductor memory, and so forth, provided within the computer or provided in equipment connected via a network.

Note that the present invention is not limited to the above described embodiments, and at the stage of implementation, various modifications may be made without departing from the essence thereof. The embodiments may be combined as appropriate and carried out, in which case the effects of combination can be obtained. Further, various types of inventions are included in the above embodiments, and various inventions can be extracted from a combination of plurality of selected components that are disclosed. For example, even if several components are omitted from all components shown in the embodiments, as long as the problem can be solved and effects are obtained, the configuration from which these components are omitted can be extracted as an invention.

REFERENCE SIGNS LIST

10 Data processing device
11 Ontology creating unit
21 Ontology reading unit
21a Ontology data storage unit
22 Device management unit
22a Device information storage unit
23 Sensor data exchange unit
23a Sensor data storage unit
24 Common exchange unit
30 Common PF server
31 Data storage unit
31a Ontology data storage unit
31b Data tree storage unit
32 Data search unit

The invention claimed is:
1. An information processing system, comprising:
a conversion proxy that is connected to devices corresponding to a plurality of types of unique internet of things (IoT) standards, and further connected to a common platform server that performs data exchange with applications,
wherein the conversion proxy includes an acquisition unit that acquires ontology data described in an ontology file generated based on user input with a data structure corresponding to the unique IoT standards,
an ontology reading unit configured to receive the ontology file and to generate an ontology entity relation ma indicative of at least one of (a) a relation between a device and a service and (b) a relation between a service and a datapoint, a device management unit that acquires and manages unique device information correlated with devices corresponding to the plurality of types of unique IoT standards, and a common exchange unit that creates a resource in which a data structure common to the plurality of types of unique IoT standards and a data exchange interface corresponding to the unique IoT standards are correlated with the common platform server, on the basis of the ontology data acquired by the acquisition unit and the device information received from the device management unit, and that performs data exchange with the common platform server using the created resource, and that outputs a data exchange request to is server for at least one of resource creation and data update.

2. The information processing system according to claim 1, wherein the common platform server has a data storage unit that stores data acquired from the devices, the resource has a first data field regarding which storing newest data acquired from the devices in the data storage unit is defined, and the common exchange unit of the conversion proxy stores the newest data acquired from the devices in the data storage unit, on the basis of the definition regarding the first data field.

3. The information processing system according to claim 1, wherein the common platform server has a data storage unit that stores data acquired from the devices, the resource has a second data field regarding which storing time-series data acquired from the devices in the data storage unit is defined, and the common exchange unit of the conversion proxy stores the time-series data acquired from the devices in the data storage unit, on the basis of the definition regarding the second data field.

4. The information processing system according to claim 1, wherein the resource has a third data field regarding which is defined acquiring, from the devices, newest data acquired from the devices, in response to a request from the application, and the common exchange unit of the conversion proxy transmits data acquired from the devices to the application via the common platform server, on the basis of the definition regarding the third data field, in response to the request from the application.

5. The information processing system according to claim 1, wherein the resource has a fourth data field regarding which is defined batch acquisition of time-series data stored in a unique storage unit correlated with the devices, in response to a request from the application, and the common exchange unit of the conversion proxy transmits data acquired from the storage unit to the application via the common platform server, on the basis of the definition regarding the fourth data field, in response to the request from the application.

6. An information processing method performed by an information processing system including a conversion proxy that is connected to devices corresponding to a plurality of types of unique internet of things (IoT) standards, and further connected to a common platform server that performs data exchange with applications, the conversion proxy acquiring ontology data described in an ontology file generated based on user input with a data structure corresponding to the unique IoT standards, the method comprising:

acquiring and managing unique device information correlated with devices corresponding to the plurality of types of unique IoT standards;

recieving the ontology file and generating an ontology entity relation map indicative of at least one of (a) a relation between a device and a service and (b) a relation between a service and a datapoint;

creating a resource in which a data structure common to the plurality of types of unique IoT standards and a data exchange interface corresponding to the unique IoT standards are correlated with the common platform server, on the basis of the ontology data that is acquired and the device information that is managed;

performing data exchange with the common platform server using the created resource; and outputting a data exchange request to a server for at least one of resource creation and data update.

7. A non-transitory computer-readable medium having computer-executable instructions that, upon execution of the instructions by a processor of a computer, cause the computer to function as the units of the information processing system according to claim 1.

* * * * *